United States Patent
Yoshikawa et al.

(10) Patent No.: US 7,810,976 B2
(45) Date of Patent: Oct. 12, 2010

(54) SURFACE EMITTING APPARATUS AND IMAGE DISPLAY APPARATUS USING THE SURFACE EMITTING APPARATUS

(75) Inventors: Motonobu Yoshikawa, Osaka (JP); Hiroshi Yamaguchi, Osaka (JP); Kazuhiko Ishimaru, Osaka (JP); Erina Yabushita, Osaka (JP)

(73) Assignee: Panasonic Corporation, Osaka (JP)

( * ) Notice: Subject to any disclaimer, the term of this patent is extended or adjusted under 35 U.S.C. 154(b) by 202 days.

(21) Appl. No.: 12/175,013

(22) Filed: Jul. 17, 2008

(65) Prior Publication Data

US 2009/0021959 A1 Jan. 22, 2009

(30) Foreign Application Priority Data

| Jul. 19, 2007 | (JP) | ............................. 2007-188507 |
| Jul. 19, 2007 | (JP) | ............................. 2007-188508 |
| Jul. 19, 2007 | (JP) | ............................. 2007-188509 |
| Jul. 20, 2007 | (JP) | ............................. 2007-189704 |
| Jul. 23, 2007 | (JP) | ............................. 2007-190604 |
| May 27, 2008 | (JP) | ............................. 2008-138525 |

(51) Int. Cl.
*F21V 7/04* (2006.01)
(52) U.S. Cl. ..................................... 362/609; 362/97.1
(58) Field of Classification Search ................. 362/609, 362/97.1
See application file for complete search history.

(56) References Cited

U.S. PATENT DOCUMENTS 5,266,788 A * 11/1993 Yamazaki et al. ...... 235/462.39
6,169,614 B1 * 1/2001 Whitcomb et al. ............ 359/15
6,259,545 B1 * 7/2001 Whitcomb et al. ....... 359/199.1

FOREIGN PATENT DOCUMENTS

JP 9-15425 1/1997
JP 2002-169480 6/2002

* cited by examiner

*Primary Examiner*—David V Bruce
(74) *Attorney, Agent, or Firm*—Hamre, Schumann, Mueller & Larson, P.C.

(57) ABSTRACT

A surface emitting apparatus and image display apparatus using this surface emitting apparatus that enables improved luminance uniformity and smaller apparatus sizes. The surface emitting apparatus has a light source section that emits light, a light guide plate that guides light incident from an inlet face such that the light is emitted from a surface of an outlet face and a scanning section that scans the light emitted from the light source section on the inlet face of the light guide plate. The image display apparatus has the surface emitting apparatus and a display panel that is arranged on a side of the outlet face of the light guide plate.

18 Claims, 24 Drawing Sheets

SURFACE EMITTING APPARATUS AND IMAGE DISPLAY APPARATUS USING THE SURFACE EMITTING APPARATUS

CROSS REFERENCE TO RELATED APPLICATIONS

The disclosures of Japanese Patent Application No. 2008-138525, filed on May 27, 2008, Japanese Patent Application No. 2007-188507, filed on Jul. 19, 2007, Japanese Patent Application No. 2007-188508, filed on Jul. 19, 2007, Japanese Patent Application No. 2007-188509, filed on Jul. 19, 2007, Japanese Patent Application No. 2007-189704, filed on Jul. 20, 2007, and Japanese Patent Application No. 2007-190604 filed on Jul. 23, 2007, including the specifications, drawings and abstracts, are incorporated herein by reference in their entirety.

BACKGROUND OF THE INVENTION

1. Field of the Invention

The present invention relates to a surface emitting apparatus and an image display apparatus using this surface emitting apparatus.

2. Description of the Related Art

Recently, accompanying the spread of mobile telephones and information devices, there are demands for thinner, high quality, and high efficiency image display apparatuses. For these various demands, to meet the demand for thinner apparatuses, for example, backlights used in liquid crystal display apparatuses are proposed. With the backlight disclosed in Japanese Patent Application Laid-Open No. HEI9-15425, many convex prism series, which reflect light with a high refractive index, are formed on one face of a light guide plate. By this means, thinner backlights can be realized.

On the other hand, to meet the demands for high quality and high efficiency apparatuses, for example, a planar light source that emits collimated light using laser light is proposed. The planar light source disclosed in Japanese Patent Application Laid-Open No. 2002-169480 has a reflector element that reflects the light emitted from a laser light source in virtually parallel to a predetermined direction and a deflector element with a deflecting face that reflects the reflected light in a virtually right-angle direction. By this means, a collimated planar light source using a single laser light can be provided in a simple configuration.

However, in order that light from the light source is incident on the light guide plate sufficiently, in the backlight disclosed in Japanese Patent Application Laid-Open No. HEI9-15425, the thickness of the light guide plate on which light from the light source is incident, needs to be thicker than the thickness of the light source. For this reason, backlights can be made thinner only to an extent.

Further, the planar light source disclosed in Japanese Patent Application Laid-Open No. 2002-169480 uses a reflection volume hologram, which results in a greater cost and makes it difficult to produce output light with high luminance uniformity.

SUMMARY OF THE INVENTION

It is therefore an object of the present invention to provide a surface emitting apparatus and image display apparatus using this surface emitting apparatus that enables improved luminance uniformity and smaller apparatus sizes.

The present invention achieves the above object by having: a light source section that emits a light; a light guide plate that guides light incident from an inlet face such that the light is emitted from a surface of an outlet face; and a scanning section that scans the light emitted from the light source section on the inlet face of the light guide plate.

Further, the present invention achieves the above object by having: a light source section that emits a light; a light guide plate that guides light incident from an inlet face such that the light is emitted from a surface of an outlet face; a scanning section that scans the light emitted from the light source section on the inlet face of the light guide plate; and a display panel that is arranged on a side of the outlet face of the light guide plate.

DETAILED DESCRIPTION OF THE PREFERRED EMBODIMENT

Embodiments of the present invention will be described in detail with reference to the accompanying drawings.

Embodiment 1

Figure 1:
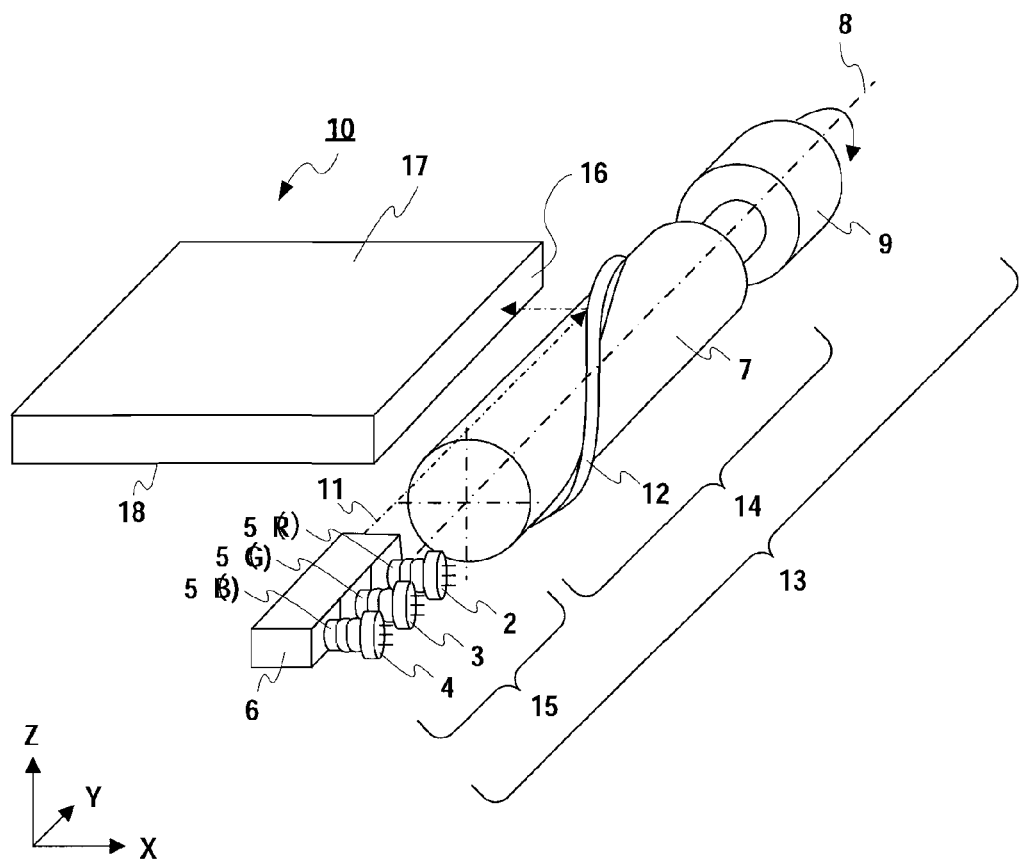
FIG. 1 is a schematic perspective view of a surface emitting apparatus according to Embodiment 1 of the present invention.
Figure 2:
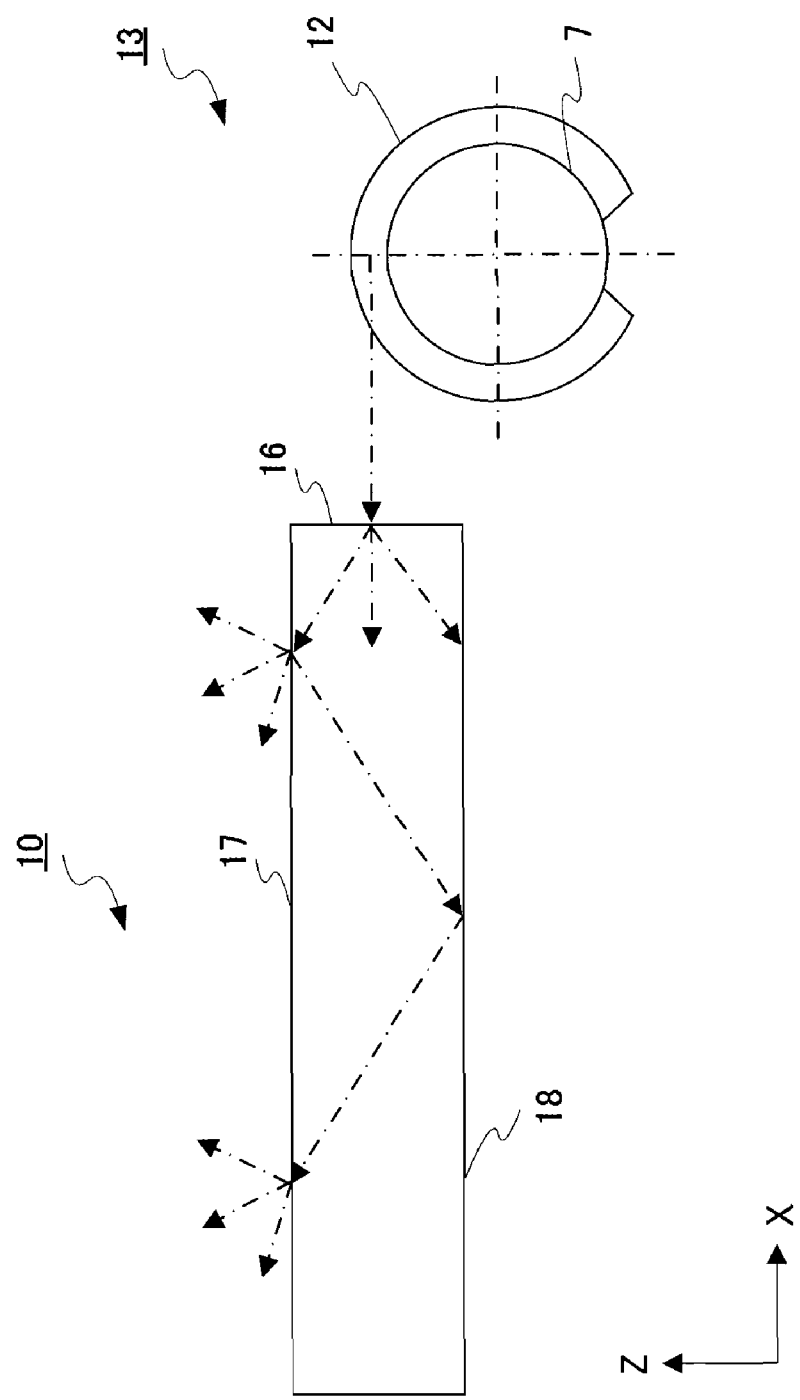
FIG. 2 is a schematic cross sectional view of the surface emitting apparatus of FIG. 1.

FIG. 1 is a schematic perspective view of a surface emitting apparatus according to Embodiment 1 of the present invention. FIG. 2 is a schematic cross sectional view of the surface emitting apparatus of FIG. 1. The surface emitting apparatus has light guide plate 10 and light scanning mechanism 13. Further, in the following embodiments, the longitudinal direction of inlet end face 16 will be referred to as "Y-axis" direction and two axes that cross with each other and with the Y-axis at right angles will be referred to as "X-axis" and "Z-axis." The Z-axis is oriented to the lateral direction (i.e. thickness direction) of inlet end face 16 and the X-axis is oriented to the direction away from inlet end face 16.

Light scanning mechanism 13 has light source section 15, helical mirror 14 and motor 9 that rotates helical mirror 14. Light source section 15 has red conductor laser 2 that produces a light of a 635 nm wavelength, green SHG laser 3 that produces a light of a 540 nm wavelength and blue conductor laser 4 that produces a light of a 450 nm wavelength, on an end face of color combining prism 6. Further, between lasers 2, 3 and 4 and color combining prism 6, collimating lenses 5(R), 5(G) and 5(B) are provided respectively and convert emitted laser lights into parallel lights.

The surface emitting apparatus has a scanning means that scans light emitted from light source section 15 (hereinafter simply "light from light source section 15") on inlet end face 16 of light guide plate 10. Helical mirror 14 reflects light from light source section 15 to light guide plate 10. By rotating helical mirror 14 by motor 9, it is possible to reflect the light emitted from light source section 15 and scan the light on inlet end face 16 of light guide plate 10 at a constant scanning speed. Motor 9 is included in a rotation control section that controls the rotation of helical mirror 14. Helical mirror 14 and the rotation control section are included in the scanning means.

Figure 3A:
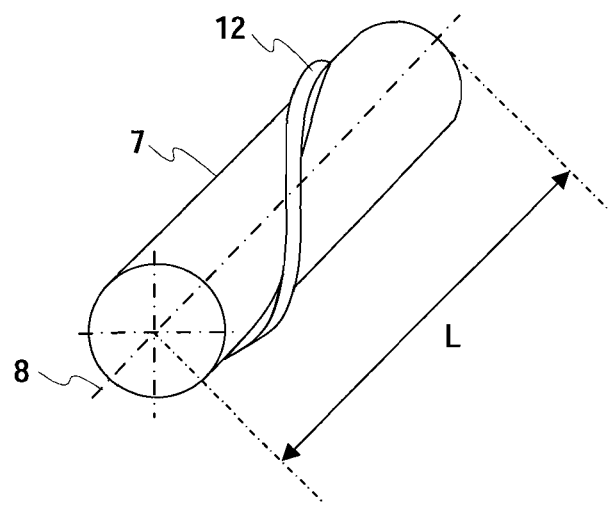
FIG. 3A is a schematic perspective view of the helical mirror shown in FIG. 1.
Figure 3B:
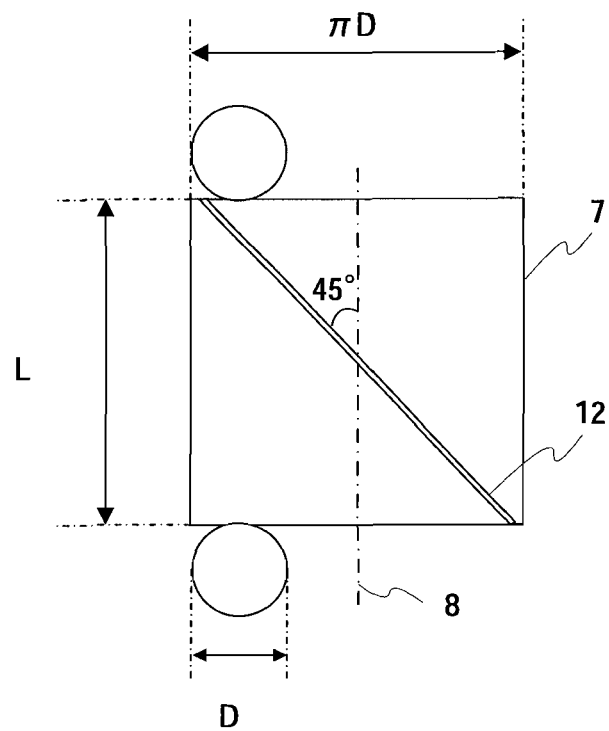
FIG. 3B is a schematic exploded view of the helical mirror shown in FIG. 1.

FIG. 3A is a schematic perspective view of helical mirror 14 and FIG. 3B is a schematic exploded view of helical mirror 14. Helical mirror 14 has columnar base 7 and reflector element 12 formed on the outer peripheral surface of base 7 to extend in helix. Reflector element 12 is formed to protrude from the outer peripheral surface of base 7, and a reflecting face is formed on at least the part on the surface of reflector element 12 facing light guide plate 10. Helical mirror 14 is arranged such that rotation axis 8 of base 7 (hereinafter "rotation axis 8 of helical mirror 14") and the optical axis of light from light source section 15 are parallel and the position of the middle of inlet end face 16 of light guide plate 10 in the Z-axis direction (i.e. the position of the middle in the thickness direction) and the position of the part in reflector element 12 in the Z-axis direction where light is incident, are equal. The middle of inlet end face 16 in the Z-axis direction extends in the longitudinal direction of inlet end face 16 passing the center of inlet end face 16. Rotation axis 8 of helical mirror 14 matches with the center axis of the helix of reflector element 12. The optical axis of light from light source section 15 crosses with part of the reflecting face of reflector element 12. In other words, the vertical distance from the outer peripheral surface of base 7 to the optical axis of light source section 15 (the distance measured in the normal direction of the outer peripheral surface) is set to become shorter than the height of reflector element 12 (reflecting face) measured from the outer peripheral surface of base 7. Further, the position of helical mirror 14 in the Z-axis direction is set such that light reflected from reflector element 12 is incident on the vicinity of the middle of inlet end face 16 in the Z-axis direction.

Reflector element 12 is formed such that the angle formed by rotation axis 8 of base 7 and reflector element 12 is 45 degrees as shown in the schematic exploded view. By this means, the light incident in parallel to rotation axis 8 is reflected and is incident vertically on inlet end face 16 of light guide plate 10. Such helical mirror 14 is made by, first, forming helical mirror 14 by resin-molding and then mirror-coating the part to be the reflecting face.

Light guide plate 10 has inlet end face 16 (inlet face) on which light from helical mirror 14 is incident, rectangular front face 17 (outlet face) that emits light and back face 18 that is parallel to front face 17. Inlet end face 16 connects with one side of front face 17. Light incident from inlet end face 16 is guided in light guide plate 10 and is emitted from front face 17. Although not shown in figures, preferably, in inlet end face 16 and front face 17, light diffusion layers that diffuse incident light are formed. The diffusion degree of the light diffusion layer formed in front face 17 changes depending on the distance from inlet end face 16. A reflection layer is formed in back face 18 to provide a reflecting face. The reflection layer reflects light incident from inlet end face 16 to front face 17.

Light guide plate 10 is formed with, for example, PMMA (acrylic resin), PC (polycarbonate) or COP (cycloolefin polymer). The above light diffusion layer is arranged in front face 17 and a reflecting sheet is arranged as the reflection layer in back face 18. The light diffusion layer is formed with a translucent resin including a light diffusion element. For the light diffusion layer, for example, a light diffusion layer with little indentations in the polyethylene terephthalate or a light diffusion layer in which a white ink causing diffuse reflection is applied to front face 17 is used. The diffusion degree of the light diffusion layer can be changed by adjusting the scale of little indentations or the scale of white ink dots. A metal film may be used for the reflecting sheet. Optionally, a metal may be deposited on back face 18. Although the reflecting sheet is arranged in back face 18 with the present embodiment, the reflecting sheet may be arranged in front face 17. In this case, the light diffusion layer is arranged closer to front face 17 than the reflecting sheet, that is, the light diffusion layer is arranged between the reflecting sheet and front face 17. The light diffusion layer may be provided in back face 18 and the outer surface of the light diffusion layer may be covered by the reflection layer. The light diffusion layer may be arranged at any area in back face 18.

Next, the operation of the surface emitting apparatus configured as described above will be described. Lights emitted from lasers 2, 3 and 4 are converted to parallel lights by collimating lenses 5 (R), 5 (G) and 5 (B) and are incident on color combining prism 6. Color combining prism 6 combines the incident parallel lights into one light. Light outputted from color combining prism 6 is incident on helical mirror 14 in parallel to rotation axis 8 and is reflected to light guide plate 10 by reflector element 12 formed on helical mirror 14. Helical mirror 14 connected with motor 9 rotates at a constant angular velocity about rotation axis 8, and the inlet position in helical mirror 14 where light is incident moves at a constant speed from the side of light source section 15 toward the side of motor 9 (i.e. Y-axis direction). If the end part of reflector element 12 on the side of motor 9 comes above the optical axis of light source section 15 accompanying the rotation of helical mirror 14 and then helical mirror 14 rotates, the end part of reflector element 12 on the side of light source section 15 comes above the optical axis of light source section 15 again. In other words, the inlet position where light is incident reaches the end part of helical mirror 14 on the side of motor 9 and then the inlet position returns to the end part of helical mirror 14 on the side of light source section 15 again. This operation is repeated thereafter. Consequently, it is possible to repeat scanning light emitted from light source section 15 at a constant scanning speed in the Y-axis direction. Further, as shown in FIG. 3A and FIG. 3B, if reflector element 12 is formed throughout the length L of base 7, the scanning width for laser light is equal to L.

Although helical mirror 14 is rotated at a constant angular velocity with the present embodiment, the present invention is not limited to this. Scanning only needs to be carried out at a constant scanning speed on inlet end face 16 of light guide plate 10, and the angular velocity may be changed depending on the shape of reflector element 12 or the arrangement of reflector element 12 on the outer peripheral surface of base 7.

As shown in FIG. 2, light reflected by reflector element 12 of helical mirror 14 is incident vertically on inlet end face 16 of light guide plate 10 and is diffused by the light diffusion layer formed in inlet end face 16. Diffused lights propagate inside light guide plate 10 repeating total reflection. With the light incident on front face 17, the light incident on front face 17 at smaller angles of incidence than the critical angle is emitted from front face 17. In this way, light emitted from light source section 15 is emitted from front face 17, which causes surface emission. As described above, the diffusion degree of the light diffusion layer formed in front face 17 is changed depending on the distance from inlet end face 16, so that it is possible to make the quantity of light emitted uniform throughout front face 17.

As described above, according to the surface emitting apparatus according to the present embodiment, by rotating helical mirror 14 with reflector element 12 formed in helix, light from light source section 15 is incident vertically on inlet end face 16 of light guide plate 10 and can be scanned at a constant scanning speed. Consequently, the present embodiment is able to make the luminance of surface emission uniform throughout front face 17. Further, the diffusion degree of the light diffusion layer arranged in light guide plate 10 is changed depending on the distance from inlet end face 16, so that it is possible to improve luminance uniformity.

Helical mirror 14 and light guide plate 10 can be arranged such that rotation axis 8 of helical mirror 14 and inlet end face 16 of light guide plate 10 are parallel. Consequently, it is possible to provide a smaller surface emitting apparatus.

By arranging light guide plate 10 and helical mirror 14 such that the position of the middle of inlet end face 16 of light guide plate 10 in the Z-axis direction and the position of the part in reflector element 12 in the Z-axis direction where light is incident are equal, light reflected by helical mirror 14 is incident vertically on inlet end face 16 of light guide plate 10. By this means, positioning of helical mirror 14 and light guide plate 10 becomes easier and the scanning accuracy can be improved.

Embodiment 2

Figure 4A:
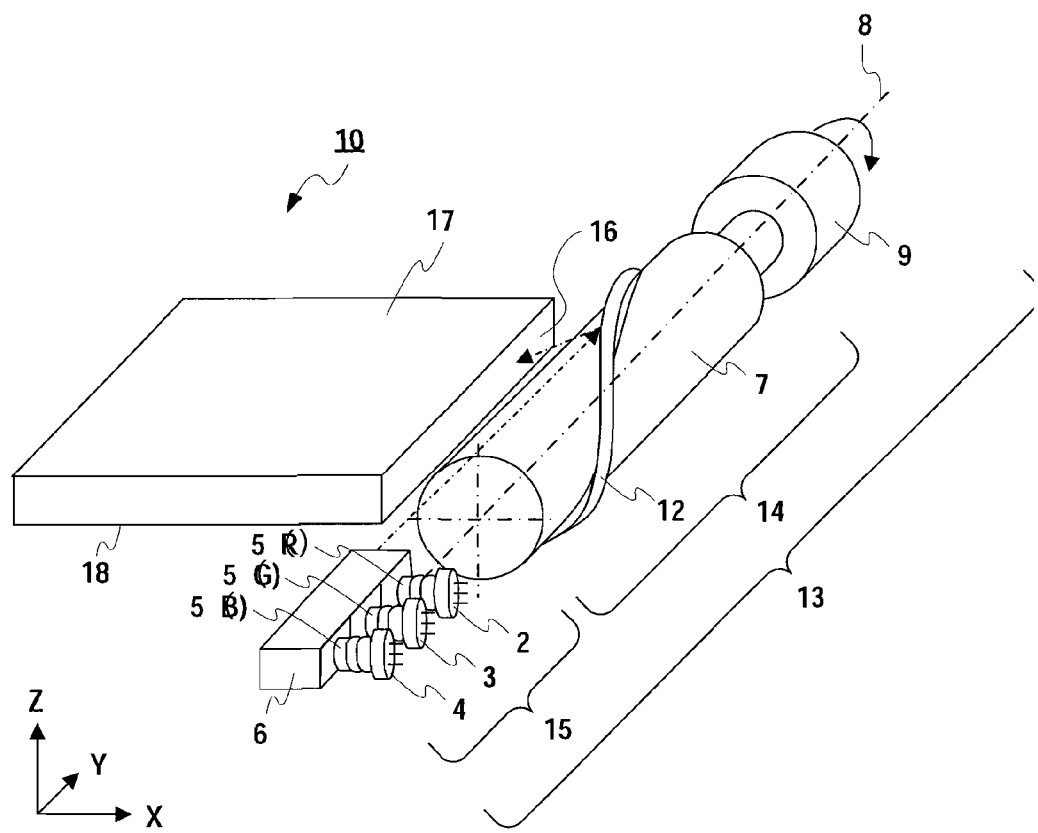
FIG. 4A is a schematic perspective view of the surface emitting apparatus according to Embodiment 2 of the present invention.
Figure 4B:
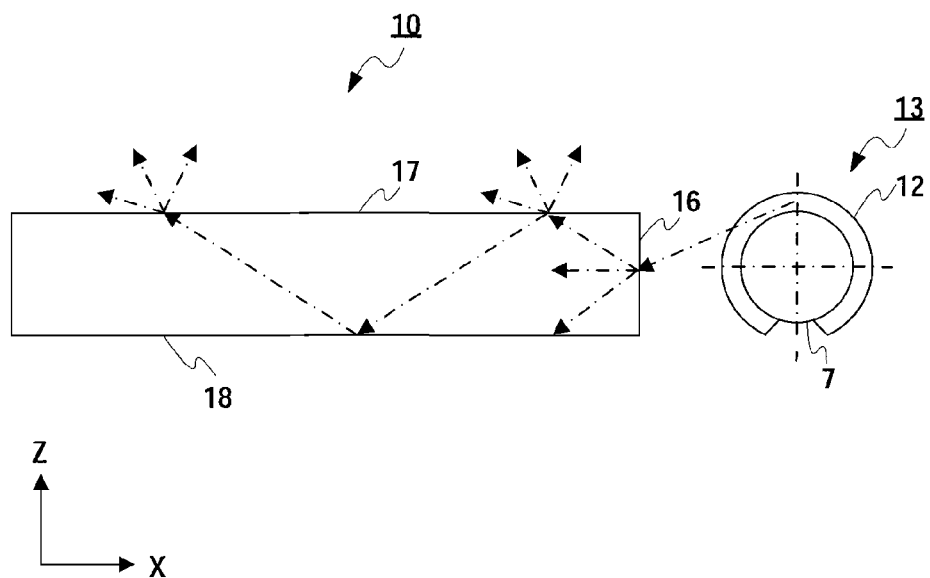
FIG. 4B is a schematic cross sectional view of the surface emitting apparatus of FIG. 4A.

Next, the surface emitting apparatus according to Embodiment 2 of the present invention will be described. FIG. 4A is a schematic perspective view of the surface emitting apparatus according to Embodiment 2 of the present invention. FIG. 4B is a schematic cross sectional view of the surface emitting apparatus of FIG. 4A. Although the surface emitting apparatus according to the present embodiment has virtually the same configuration as the surface emitting apparatus according to Embodiment 1 except for the arrangement of the helical mirror. In the following embodiments, differences from Embodiment 1 will be mainly described, and the same components as in Embodiment 1 will be assigned the same reference numerals and repetition of description will be omitted.

With Embodiment 1, helical mirror 14 and light guide plate 10 are arranged such that the position of the part in reflector element 12 in the Z-axis direction where light is incident and the position of the middle of inlet end face 16 of light guide plate 10 in the Z-axis direction are equal. However, with the present embodiment, as shown in FIG. 4B, helical mirror 14 and light guide plate 10 are arranged such that the position of the part in reflector element 12 in the Z-axis direction where light is incident and the position in front face 17 of light guide plate 10 in the Z-axis direction are equal. The position in rotation axis 8 of helical mirror 14 in the Z-axis direction is equal to the position of the middle of inlet end face 16 of light guide plate 10 in the Z-axis direction.

With Embodiment 1, reflector element 12 reflects incident light in parallel to the X-axis. However, the shape of reflector element 12 according to the present embodiment is formed so as to reflect light from light source section 15 in a direction diagonal to inlet end face 16 and direct light toward the vicinity of the middle of inlet end face 16 of light guide plate 10 in the Z-axis direction.

As described above, according to the surface emitting apparatus of the present embodiment, helical mirror 14 is arranged so as not to extend farther than back face 18 of light guide plate 10 in the Z-direction, so that it is possible to provide components of the surface emitting apparatus in an efficient arrangement. Consequently, according to the present embodiment, in addition to the effect of Embodiment 1, it is possible to provide a thinner surface emitting apparatus.

Embodiment 3

Figure 5A:
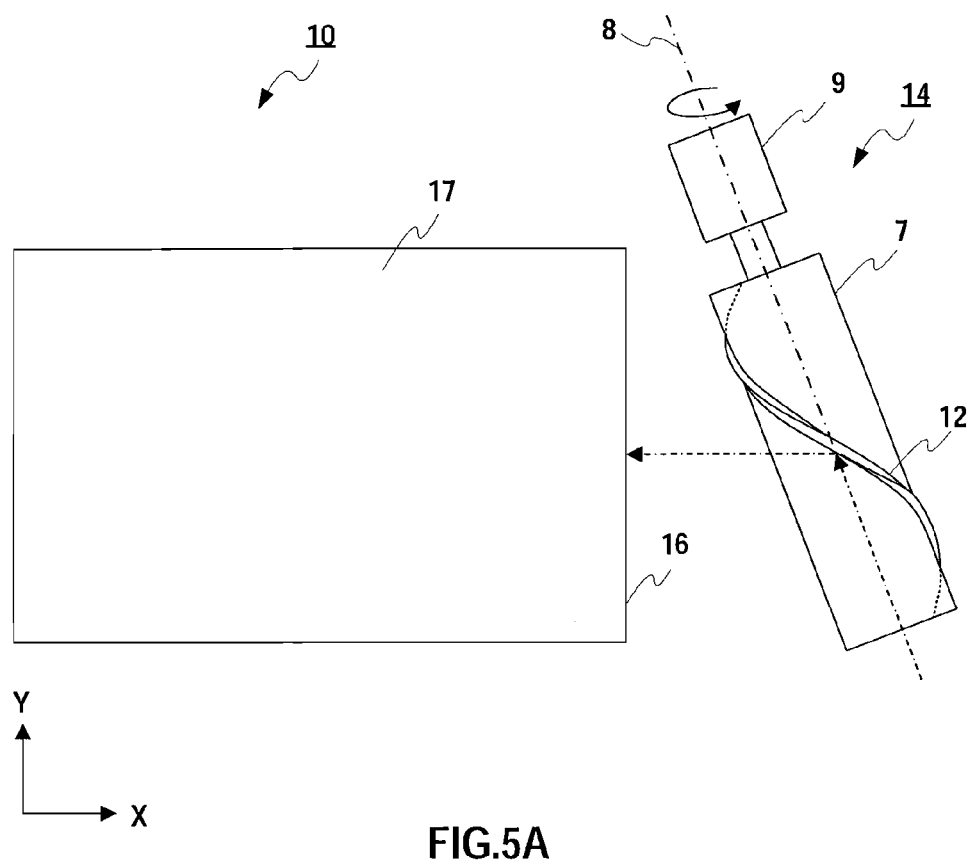
FIG. 5A is a schematic top view of the surface emitting apparatus according to Embodiment 3 of the present invention.
Figure 5B:
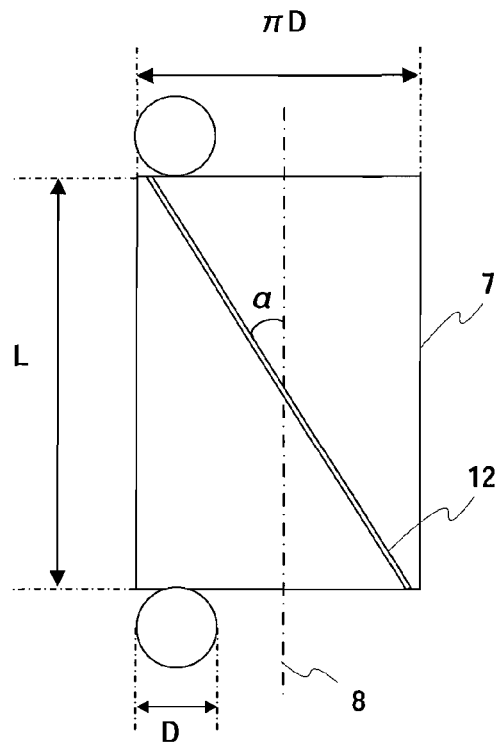
FIG. 5B is a schematic exploded view of the helical mirror shown in FIG. 5A.

Next, the surface emitting apparatus according to Embodiment 3 of the present invention will be described. FIG. 5A is a schematic top view of the surface emitting apparatus according to Embodiment 3 of the present invention. FIG. 5B is a schematic exploded view of helical mirror 14 shown in FIG. 5A. The surface emitting apparatus according to the present embodiment has virtually the same configuration as the surface emitting apparatus according to Embodiment 1 but is different from Embodiment 1 in arranging helical mirror 14 diagonally to light guide plate 10.

With Embodiment 1, helical mirror 14 and light guide plate 10 are arranged such that rotation axis 8 and inlet end face 16 of light guide plate 10 are parallel. However, with the present embodiment, helical mirror 14 is arranged such that rotation axis 8 is diagonal to inlet end face 16 of the light guide plate.

Similar to Embodiment 1, reflector element 12 is formed in helix on the outer peripheral surface of base 7. However, as shown in FIG. 5B, the present embodiment differs from Embodiment 1 in forming reflector element 12 such that the angle α formed by rotation axis 8 and reflector element 12 is lower than 45 degrees.

If the angle α is equal to 45 degrees (Embodiment 1), the length πD of the outer periphery of base 7 is virtually equal to the length L of base 7. Consequently, the diameter D of base 7 is virtually equal to L/π. By contrast with this, if the angle α is lower than 45 degrees (the present embodiment), the length πD of the outer peripheral surface of base 7 can be made shorter than the length L of base 7. As a result, it is possible to make the diameter D of base 7 lower than L/π. Consequently, according to the present embodiment, it is possible to make thinner the thickness of the surface emitting apparatus using more compact helical mirror 14 than in Embodiment 1.

Helical mirror 14 is arranged such that rotation axis 8 of helical mirror 14 tilts toward inlet end face 16 of light guide plate 10. By suitably adjusting the angle of rotation axis 8 with respect to inlet end face 16 according to the angle α, light reflected by reflector element 12 can be incident vertically on inlet end face 16 of light guide plate 10.

As described above, in addition to the same effect as Embodiment 1, the surface emitting apparatus according to the present embodiment is able to make the diameter of base 7 smaller, so that it is possible to realize a thinner surface emitting apparatus than in Embodiment 1.

Embodiment 4

Figure 6:
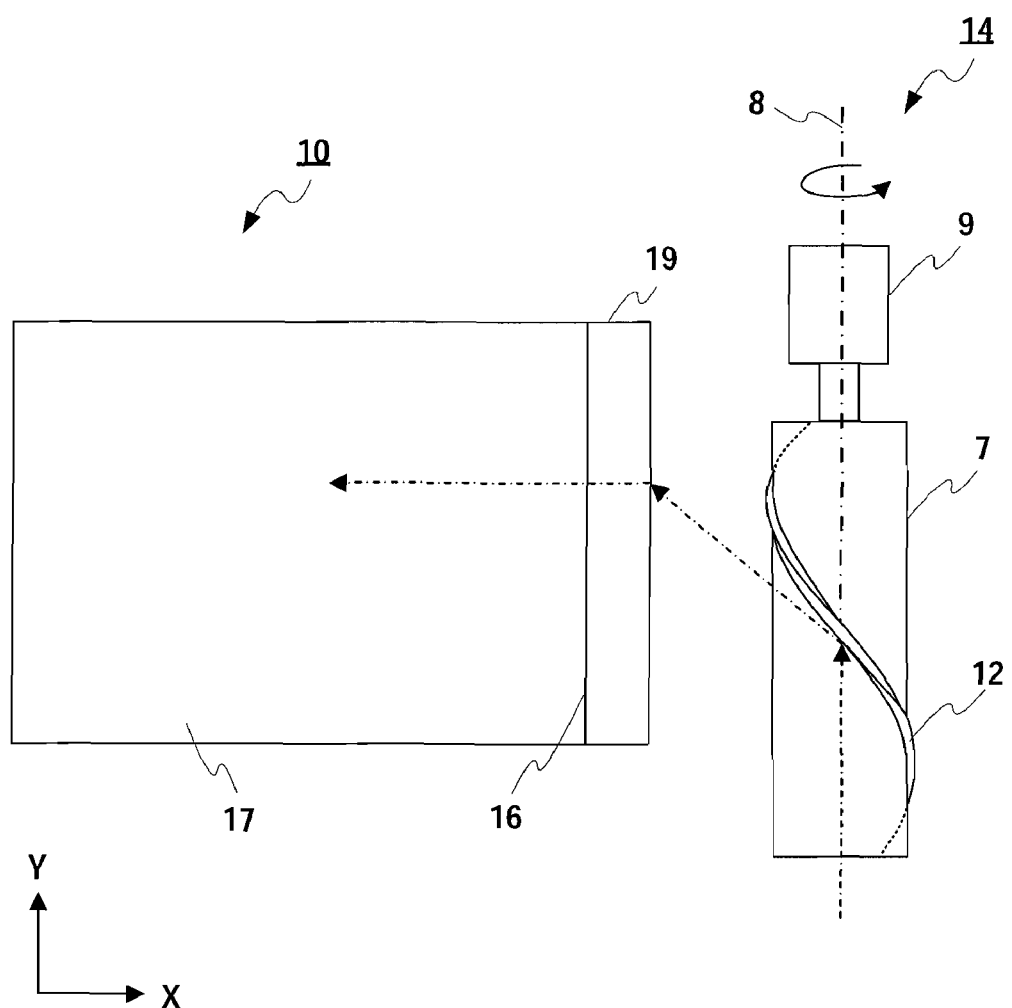
FIG. 6 is a schematic top view of the surface emitting apparatus according to Embodiment 4 of the present invention.

The surface emitting apparatus according to Embodiment 4 of the present invention will be described. FIG. 6 is a schematic top view of the surface emitting apparatus according to Embodiment 4 of the present invention. The surface emitting apparatus according to the present embodiment has helical mirror 14 of Embodiment 3, and prism sheet 19 is further formed on inlet end face 16 of light guide plate 10.

With the present embodiment, helical mirror 14 and light guide plate 10 are arranged such that rotation axis 8 and inlet end face 16 are parallel. However, similar to Embodiment 3, the angle α of reflector element 12 with respect to rotation axis 8 is set to a lower value than 45 degrees. For this reason, light reflected by reflector element 12 of helical mirror 14 is incident diagonally to prism sheet 19 but is refracted by the prism face of prism sheet 19, so that light is incident vertically on inlet end face 16. Consequently, even if helical mirror 14 that does not output light vertically with respect to inlet end face 16 is used, luminance uniformity is not decreased. Further, with the present embodiment, no extra space is required to arrange helical mirror 14, so that it is possible to reduce the size of the surface emitting apparatus in the X-axis direction than Embodiment 3.

As described above, the surface emitting apparatus according to the present embodiment is able to use helical mirror 14 with base 7 of a small diameter and arrange helical mirror 14 and light guide plate 10 in an efficient manner, so that it is possible to provide a more compact surface emitting apparatus.

Embodiment 5

Figure 7A:
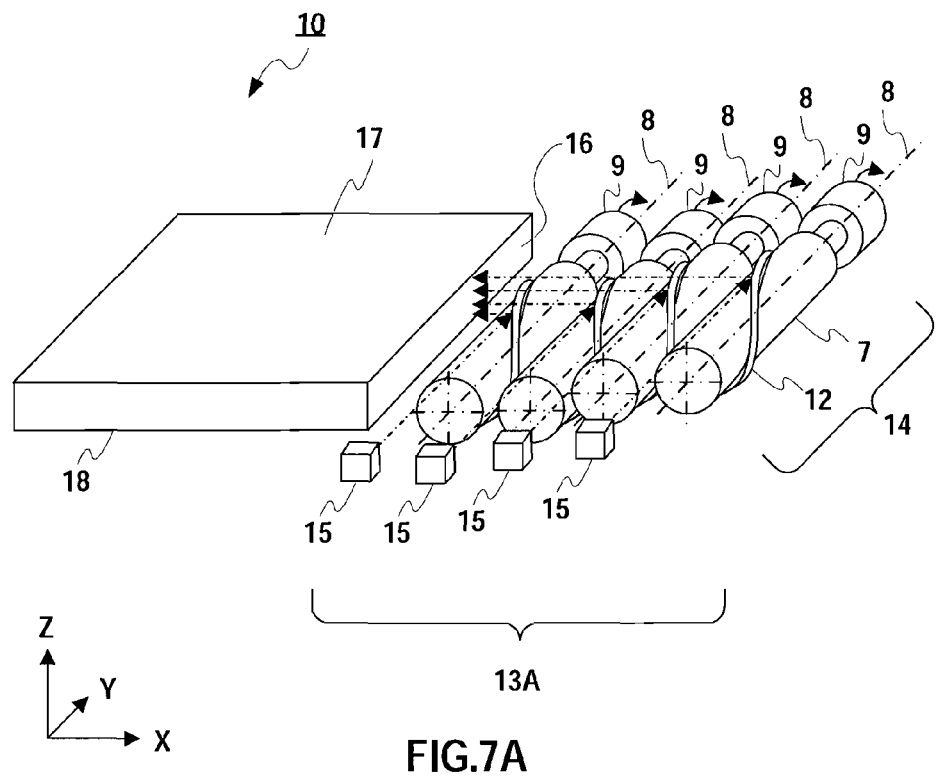
FIG. 7A is a schematic perspective view of the surface emitting apparatus according to Embodiment 5 of the present invention.
Figure 7B:
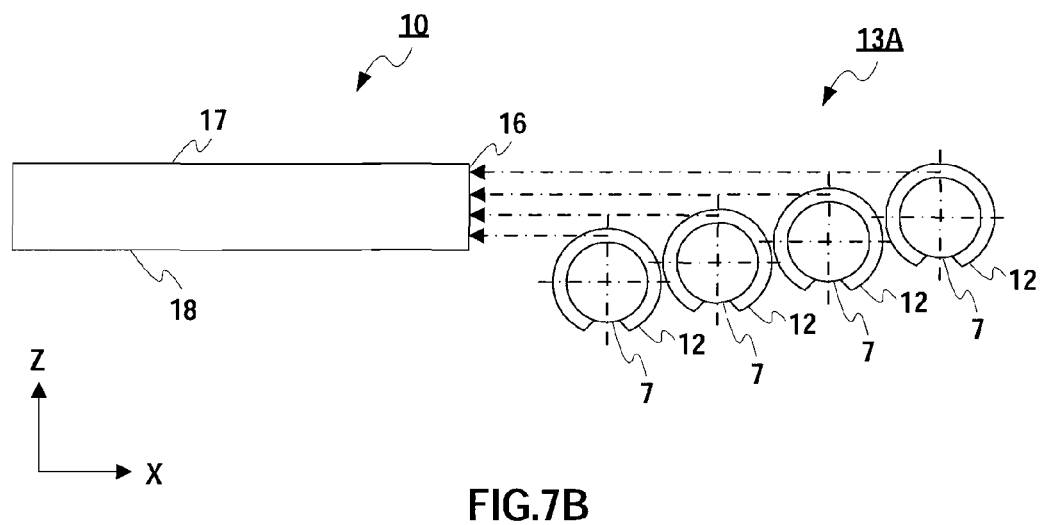
FIG. 7B is a schematic cross sectional view of the surface emitting apparatus of FIG. 7A.

Next, the surface emitting apparatus according to Embodiment 5 of the present invention will be described. FIG. 7A is a schematic perspective view of the surface emitting apparatus according to Embodiment 5 of the present invention. FIG. 7B is a schematic cross sectional view of the surface emitting apparatus. The surface emitting apparatus according to the present embodiment differs from Embodiment 1 in having a plurality of light source sections 15 and helical mirrors 14.

Light scanning mechanism 13A has a plurality of light source sections 15, the same number of helical mirrors 14 as the number of light source sections 15 and motors 9 attached to helical mirrors 14. Each helical mirror 14 is supported such that rotation axis 8 is parallel to the Y-axis. Using the position of rotation axis 8 of helical mirror 14 closest to inlet end face 16 of light guide plate 10 for the reference position, rotation axes 8 of other helical mirrors 14 are shifted from the reference position in the X-axis direction and the Z-axis direction. Helical mirrors 14 that are shifted farther in the plus X direction, are shifted farther in the plus Z direction. "Plus X direction" refers to the direction away from inlet end face 16 and "plus Z direction" refers to the direction toward front face 17 from back face 18. A plurality of rotation axes 8 of helical mirrors 14 are arranged stepwise. Light source sections 15 are arranged respectively so as to emit lights in parallel to rotation axes 8 of helical mirrors 14. The emission spectrum varies between light source sections 15. Motors 9 are included in rotation control section that controls rotations of helical mirrors 14. Helical mirrors 14 and the rotation control section are included in the scanning means.

In the surface emitting apparatus configured in this way, lights emitted from light source sections 15 are reflected by reflector elements 12 of helical mirrors 14, and are incident on inlet end face 16 of light guide plate 10. In this case, each helical mirror 14 is arranged off the optical paths of reflected lights from other helical mirrors 14. Accordingly light reflected by reflector element 12 of each of helical mirrors 14 is not blocked by adjacent helical mirror 14.

As described above, the surface emitting apparatus according to the present embodiment is able to provide a plurality of helical mirrors 14 in a compact arrangement and scan a plurality of lights at the same time. Consequently, it is possible to provide a thinner and smaller surface emitting apparatus with high luminance uniformity.

A plurality of light source sections 15 of different emission spectra are provided, so that it is possible to scan a plurality of lights at the same time. Consequently, the surface emitting apparatus according to the present embodiment does not need to have a combining means that combines lights of different emission spectra. Accordingly, the present embodiment is able to provide the surface emitting apparatus in a simpler configuration.

Although a plurality of light source sections 15 of different emission spectra are used with the present embodiment, the present invention is not limited to this. A plurality of light source sections each of which emits light of the same spectrum may be used. By this means, the quantity of light incident on light guide plate 10 can be changed depending on the number of light source sections, so that it is possible to adjust luminance.

Embodiment 6

Figure 8A:
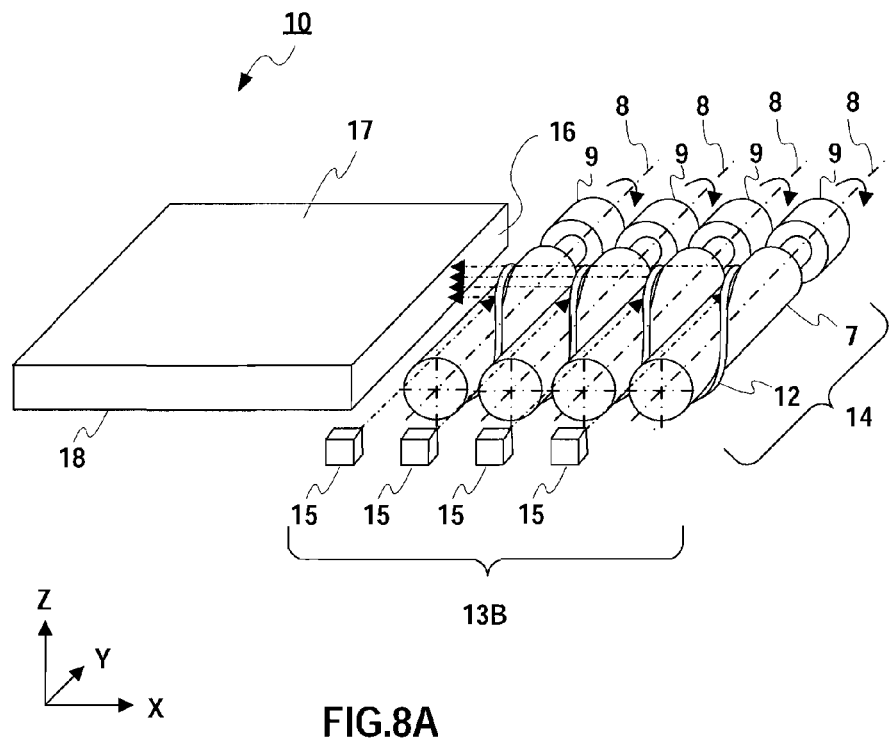
FIG. 8A is a schematic perspective view of the surface emitting apparatus according to Embodiment 6 of the present invention.
Figure 8B:
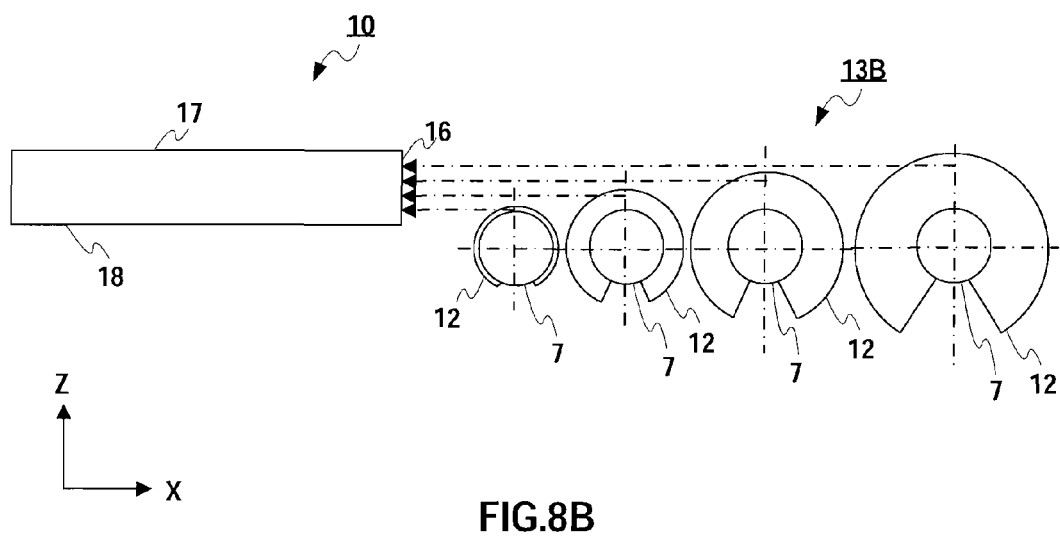
FIG. 8B is a schematic cross sectional view of the surface emitting apparatus of FIG. 8B.

Next, the surface emitting apparatus according to Embodiment 6 of the present invention will be described. FIG. 8A is a schematic perspective view of the surface emitting apparatus according to Embodiment 6 of the present invention. FIG. 8B is a schematic cross sectional view of the surface emitting apparatus of FIG. 8A. With the surface emitting apparatus according to Embodiment 5, rotation axes 8 of helical mirrors 14 are arranged stepwise such that lights toward light guide plate 10 from reflector elements 12 are not blocked. However, the present embodiment differs from Embodiment 5 in arranging helical mirrors 14 such that rotation axes 8 are parallel on virtually the same plane.

Light scanning mechanism 13B has a plurality of light source sections 15, the same number of helical mirrors 14 as the number of light source sections 15 and motors 9. Rotation axes 8 of helical mirrors 14 are arranged apart from each other in the X-axis direction. Rotation axes 8 of helical mirrors 14 are arranged on the same X-Y plane. The emission spectrum varies between light source sections 15.

As shown in FIG. 8B, the height (i.e. radial thickness) varies between reflector elements 12 of helical mirrors 14 such that each of helical mirrors 14 dose not block light from adjacent helical mirror 14 toward light guide plate 10. The height of each reflector element 12 is set depending on the distance between this helical mirror 14 and light guide plate 10. The distance between rotation axis 8 of helical mirror 14 and the inlet position in reflector element 12 of this helical mirror 14 where light is incident increases depending on the distance between this rotation axis 8 and inlet end face 16 of light guide plate 10. The height of reflector element 12 of helical mirror 14 closest to light guide plate 10 is the lowest and the height of reflector element 12 of helical mirror 14 farthest away from light guide plate 10 is the tallest. FIG. 8B emphasizes the differences between the heights of reflector elements 12.

In the surface emitting apparatus configured in this way, lights emitted from a plurality of light source sections 15 are reflected by reflector elements 12 of a plurality of helical mirrors 14, and are incident on inlet end face 16 of light guide plate 10. The height varies between reflector elements 12 of helical mirrors 14, and so lights toward light guide plate 10 are not blocked.

As described above, according to the surface emitting apparatus of the present embodiment, helical mirrors 14 only need to be arranged such that rotation axes 8 are positioned on the same plane, which makes positioning of a plurality of helical mirrors 14 easy. Further, positioning of light source sections 15 and motors 9 associated with helical mirrors 14 is easy. Consequently, the surface emitting apparatus according to the present embodiment has the effect of Embodiment 5, and the surface emitting apparatus of the present embodiment makes possible a surface emitting apparatus that can be made thinner and smaller and that is easy to assemble.

Similar to Embodiment 5, light source sections of the same emission spectra may be used. By this means, the quantity of light incident on light guide plate 10 can be changed depending on the number of light source sections, so that it is possible to adjust luminance.

Embodiment 7

Figure 9A:
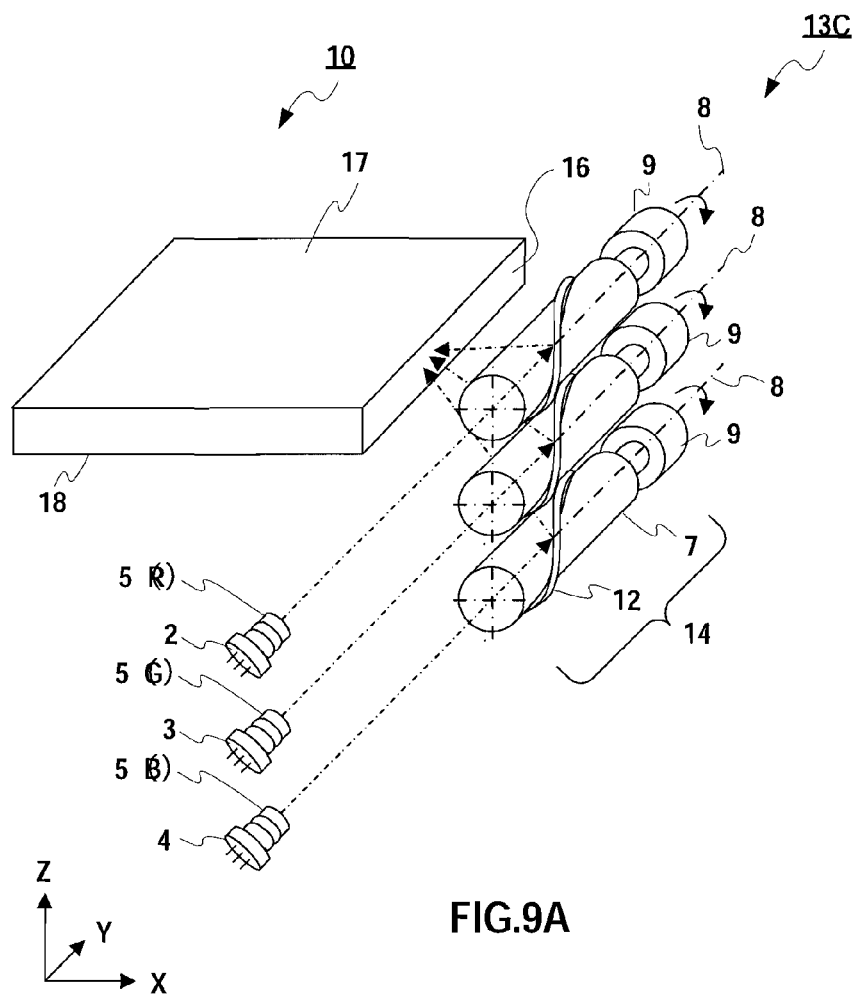
FIG. 9A is a schematic perspective view of the surface emitting apparatus according to Embodiment 7 of the present invention.
Figure 9B:
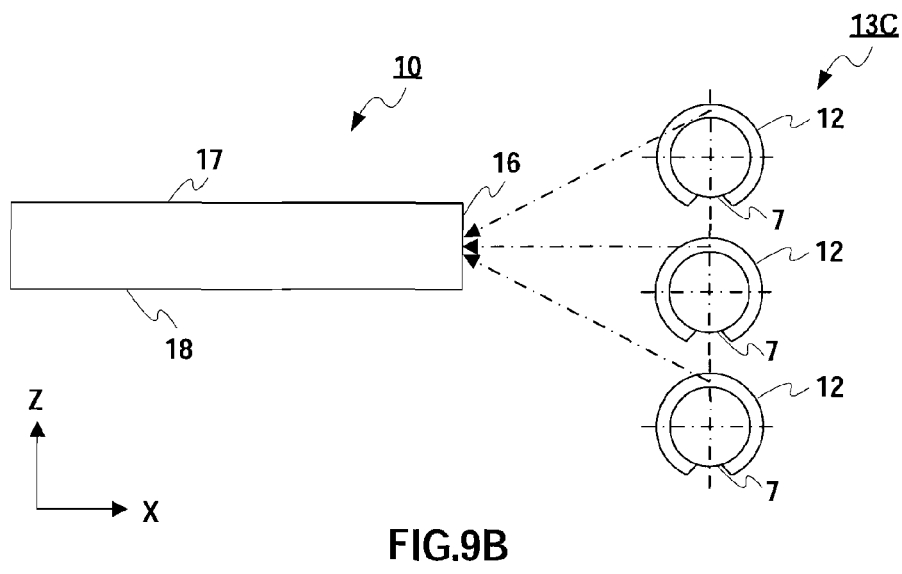
FIG. 9B is a schematic cross sectional view of the surface emitting apparatus of FIG. 9A.

Next, the surface emitting apparatus according to Embodiment 7 of the present invention will be described. FIG. 9A is a schematic perspective view of the surface emitting apparatus according to Embodiment 7 of the present invention. FIG. 9B is a schematic cross sectional view of the surface emitting apparatus of FIG. 9A. Although, with Embodiment 6, a plurality of rotation axes 8 of helical mirrors 14 are arranged on the X-Y plane, a plurality of rotation axes 8 of helical mirrors 14 of the present embodiment are arranged on the Y-Z plane. A plurality of rotation axes 8 of helical mirrors 14 extend in the Y-axis direction and are spaced apart from each other.

Light scanning mechanism 13C has lasers (light source sections) 2, 3, and 4, helical mirrors 14 and motors 9. Helical mirror 14 and motor 9 is provided for each of lasers 2, 3, and 4. The angle of inclination of the reflecting face of reflector element 12 provided for each of helical mirrors 14, varies between reflector elements 12. The reflecting face of reflector element 12 of each helical mirror 14 is diagonal so as to reflect light from associated laser 2, 3 or 4 toward the middle of inlet end face 16, depending on the difference between position of light guide plate 10 in the Z-axis direction and position of this helical mirror 14 in the Z-axis direction. A plurality of lasers 2, 3 and 4 are arranged in line in the Z-axis direction such that the optical axes of lasers 2, 3 and 4 are parallel in association with the arrangement of a plurality of helical mirrors 14. Also with the present embodiment, the emission spectrum varies between lasers 2, 3 and 4.

In the surface emitting apparatus configured in this way, lights emitted from lasers 2, 3 and 4 are reflected by reflector elements 12 of helical mirrors 14, and are incident on the vicinity of the middle of light guide plate 10 in the Z-axis direction. Rotation axes 8 of helical mirrors 14 are arranged on the Y-Z plane and so light from each of helical mirrors 14 toward light guide plate 10 is not blocked by adjacent helical mirrors 14.

As described above, the surface emitting apparatus according to the present embodiment is able to provide a plurality of helical mirrors 14 in a compact arrangement and scan a plurality of lights at the same time. Consequently, according to the surface emitting apparatus of the present invention, it is possible to provide a thinner and smaller surface emitting apparatus with high luminance uniformity.

According to the surface emitting apparatus of the present embodiment, lights incident on helical mirrors 14 are reflected by reflector elements 12 and are incident on the vicinity of the middle of inlet end face 16, so that it is possible to make the thickness of light guide plate 10 thinner. Consequently, according to the surface emitting apparatus of the present embodiment, it is possible to provide a thinner surface emitting apparatus.

According to the surface emitting apparatus of the present embodiment, helical mirrors 14 only need to be arranged such that rotation axes 8 are positioned on the same plane, which makes positioning of a plurality of helical mirrors easy. According to the surface emitting apparatus of the present embodiment, positioning of lasers 2, 3 and 4 and motors 9 associated with helical mirrors 14 is easy. Consequently, according to the surface emitting apparatus of the present embodiment, it is possible to provide a surface emitting apparatus that is easy to assemble.

Although, with the present embodiment, in order that light is incident near the middle of inlet end face 16 of light guide plate 10, the shape varies between reflector elements 12, a plurality of helical mirrors may be used in which reflector elements are formed in the same shape. In this case, the angles of incidences of incident lights on inlet end face 16 may be controlled by adjusting the positions of optical axes of lasers 2, 3 and 4. To be more specific, the angles of incidences can be adjusted by shifting the positions of the optical axes of lasers 2, 3 and 4 in the circumferential directions of bases 7. A plurality of helical mirrors with reflector elements in the same shape can be made at ease.

Although lasers 2, 3 and 4 of different emission spectra are used with the present embodiment, a plurality of lasers of the same emission spectrum may be used.

Embodiment 8

Next, the surface emitting apparatus according to Embodiment 8 of the present invention will be described. The surface emitting apparatus according to the present embodiment has virtually the same configuration as in Embodiment 1 except for the configuration of helical mirror 14. That is, the base that has shapes other than the column is used for helical mirror 14 of the present embodiment.

Figure 10A:
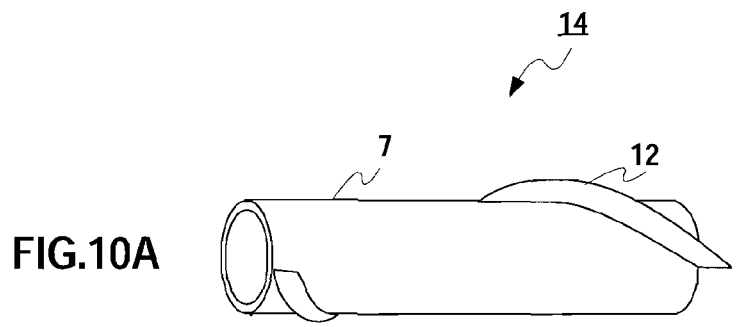
FIG. 10A is a schematic perspective view of an example of the helical mirror in the surface emitting apparatus according to Embodiment 8 of the present invention.
Figure 10B:
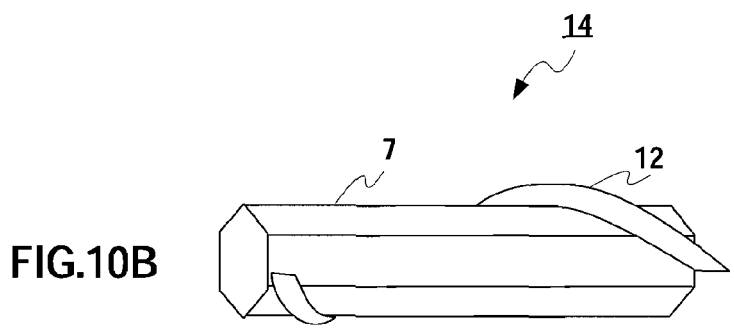
FIG. 10B is a schematic perspective view of another example of the helical mirror according to Embodiment 8 of the present invention.
Figure 10C:
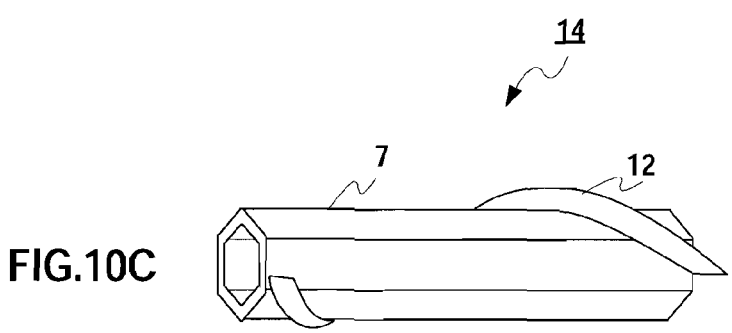
FIG. 10C is a schematic perspective view of another variation of the example of the helical mirror according to Embodiment 8 of the present invention.

Similar to the above embodiments, reflector element 12 is formed in helix on the outer peripheral surface of helical mirror 14, not only the column but also other shapes such as the prism is used for the base. For example, even if hollow cylindrical base 7 shown in FIG. 10A, prism base 7 shown in FIG. 10B and/or hollow prism base 7 shown in FIG. 10C is used, it is possible to obtain the same effects as in the above embodiments.

Figure 10D:
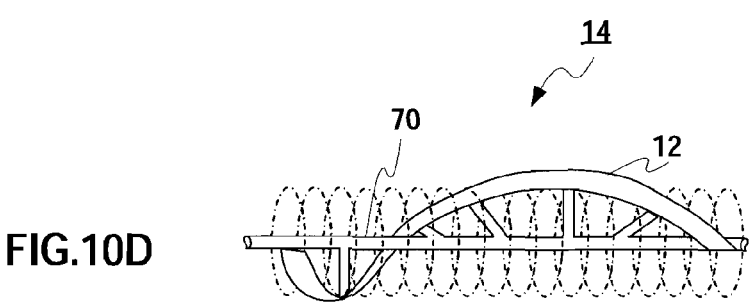
FIG. 10D is a schematic perspective view of another variation of the example of the helical mirror according to Embodiment 8 of the present invention.

Further, in addition to a pillar base, by using, for example, the base configured with wire frame 70 shown in FIG. 10D, it is possible to obtain the same effects. According to this configuration, it is possible to provide a lighter surface emitting apparatus.

Further, the shape of helical mirror 14 is not limited to the above examples, and reflector element 12 should be configured such that light incident on helical mirror 14 is incident vertically on inlet end face 16 of light guide plate 10 and can be scanned at a constant scanning speed.

Embodiment 9

Figure 11:
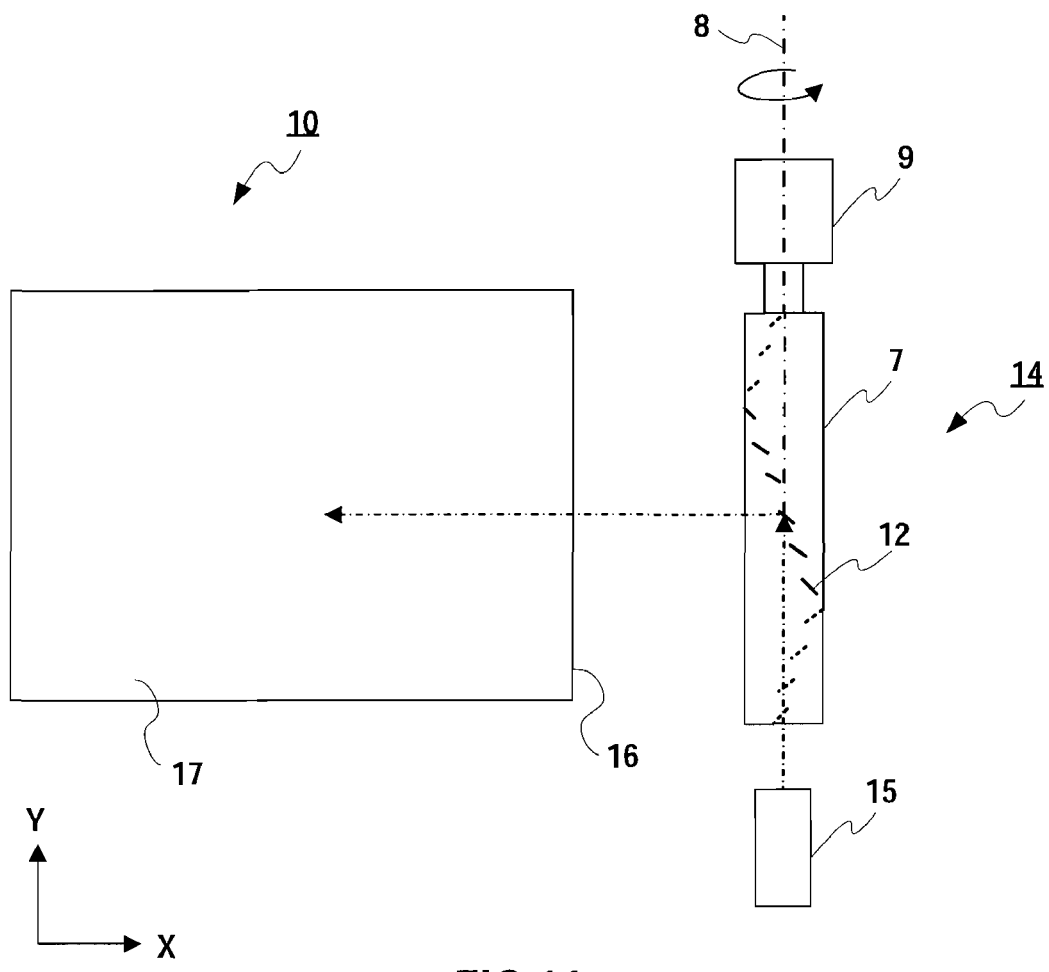
FIG. 11 is a schematic top view of the surface emitting apparatus according to Embodiment 9 of the present invention.

Next, the surface emitting apparatus according to Embodiment 9 of the present invention will be described. FIG. 11 shows a schematic top view showing the configuration of the surface emitting apparatus according to Embodiment 9 of the present invention. The surface emitting apparatus of the present embodiment has virtually the same configuration as in Embodiment 1, but is different from Embodiment 1 in forming a plurality of reflector elements 12 discontinuously at regular intervals on the outer peripheral surface of base 7.

Figure 12A:
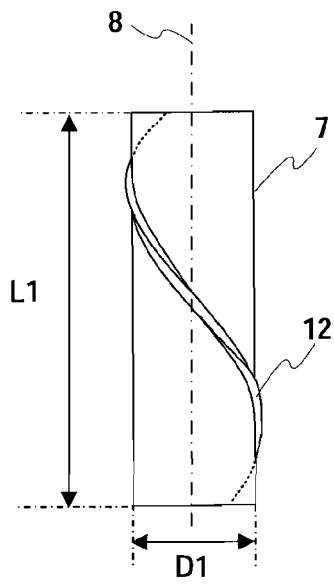
FIG. 12A is a top view of the helical mirror shown in FIG. 1.
Figure 12B:
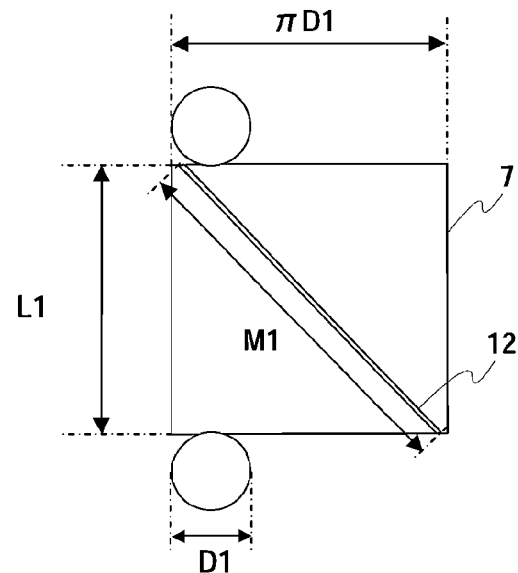
FIG. 12B is an exploded view of the helical mirror shown in FIG. 12A.
Figure 12C:
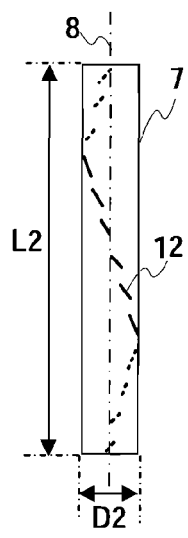
FIG. 12C is a top view of the helical mirror shown in FIG. 11.
Figure 12D:
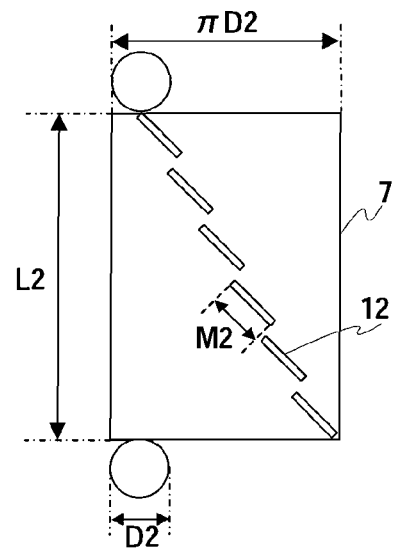
FIG. 12D is an exploded view of the helical mirror shown in FIG. 12C.

The helical mirror of the present embodiment will be described in comparison with helical mirror 14 of Embodiment 1 shown in FIG. 1. FIG. 12A is a top view of helical mirror 14 of Embodiment 1. FIG. 12B is an exploded view of helical mirror 14 of Embodiment 1. FIG. 12C is a top view of helical mirror 14 of the present embodiment. FIG. 12D is an exploded view of helical mirror 14 of the present embodiment. As shown in FIG. 12A to FIG. 12D, the helical mirrors of Embodiment 1 and the present embodiment share in common arranging reflector element(s) 12 in helix on the outer peripheral surface of base 7 about the rotation axis of base 7. However, helical mirror 14 of the present embodiment differs from Embodiment 1 in arranging reflector elements 12 intermittently in the direction of the rotation axis and continuously in the circumferential direction of base 7. Helical mirror 14 of Embodiment 1 has one linear reflector element 12. By contrast with this, helical mirror 14 of the present embodiment has a plurality of reflector elements 12.

Reflector elements 12 are formed to protrude from the outer peripheral surface of base 7 and are arranged intermittently, in helix, on the outer peripheral surface of base 7. To be more specific, reflector elements 12 are arranged at predetermined intervals in the direction of the rotation axis of base 7 (i.e. longitudinal direction) and are arranged without intervals in the circumferential direction of base 7. That is, adjacent reflector elements 12 are spaced apart in the direction of the rotation axis of base 7 and are arranged without space as viewed from the direction of the rotation axis of base 7. In the part of the surfaces of reflector elements 12 facing toward light source section 15 and inlet end face 16, reflecting faces are formed.

When reflector elements 12 are arranged intermittently in this way in the longitudinal direction of base 7, a scan is carried out in a dotted line on areas of inlet end face 16 of light guide plate 10 opposite to reflector elements 12. Even when a scan is carried out in a dotted line on inlet end face 16, incident light is diffused in the longitudinal direction (i.e. Y-axis direction) of inlet end face 16 according to the effects of the light diffusion layer and reflection layer formed in light guide plate 10. Consequently, by appropriately setting the intervals for arranging reflector elements 12, it is possible to make the luminance of surface emission virtually uniform.

Particularly, with the present embodiment, the diameter of base 7 can be made shorter than the one in Embodiment 1 for the following reason. As shown in FIG. 12D, when reflector elements 12 are provided intermittently, the total sum n·M2 (where n is the number of reflector elements 12) of the length M2 of reflector element 12 is shorter than the length M1 of reflector element 12 shown in FIG. 12B. Consequently, when angle formed by rotation axis 8 of base 7 and reflector element 12 of Embodiment 1 and angle formed by rotation axis 8 of base 7 and each of reflector elements 12 of the present embodiment are equal, the length πD2 in the circumferential direction of base 7 required to arrange reflector elements 12 can be made shorter than the length πD1 of Embodiment 1. As a result, the diameter of base 7 used in helical mirror 14 of the present embodiment is made shorter than the one in Embodiment 1. To make comparison between FIG. 12B and FIG. 12D easier, the number of reflector elements 12 shown in FIG. 12D is reduced compared to the number of reflector elements 12 shown in FIG. 12C.

Consequently, the present embodiment is able to make the diameter of base 7 shorter than Embodiment 1, so that it is possible to realize a smaller surface emitting apparatus.

Figure 13A:
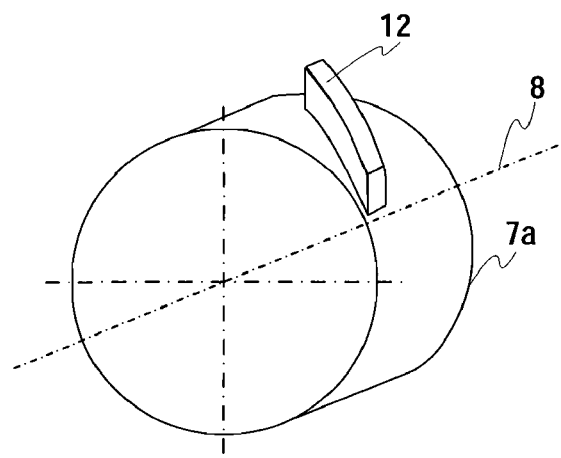
FIG. 13A is a schematic perspective view of the partial mirror of the helical mirror shown in FIG. 11.
Figure 13B:
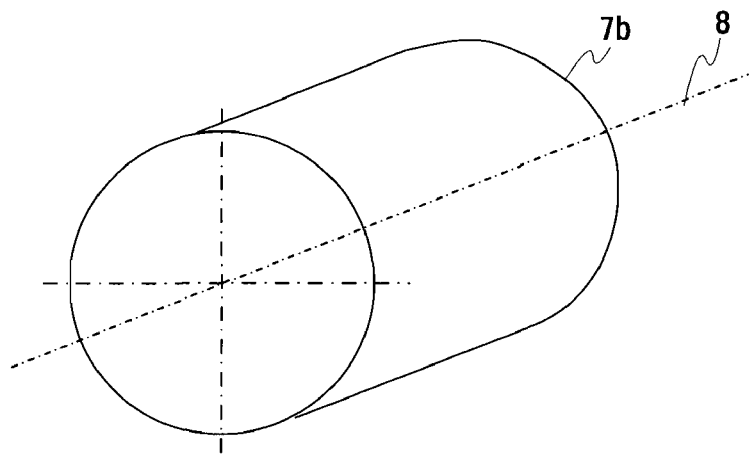
FIG. 13B is a schematic perspective view of the spacer of the helical mirror shown in FIG. 11.

FIG. 13A is a partial mirror which is a component of helical mirror 14 shown in FIG. 11. FIG. 13B shows a spacer which is another component of helical mirror 14 shown in FIG. 11.

Helical mirror 14 of the present embodiment is made by, for example, combining a plurality of partial mirrors and spacers 7b as follows. The partial mirrors and spacers 7b are jointed alternately. First, a partial mirror (FIG. 13A) in which one reflector element 12 is formed on the outer peripheral surface of columnar base 7a and columnar spacer 7b (FIG. 13B) that has the same diameter as base 7a of the partial mirror and that has a predetermined length, are provided. Next, the partial mirror and spacer 7b are jointed such that their center axes are positioned on the same line. Further, another partial mirror is provided and jointed with spacer 7b such that center axes of another partial mirror and spacer 7b are positioned on the same line. In this case, the partial mirror to be jointed is rotated a predetermined angle about the center axis with respect to spacer 7b, such that there is no space between reflector elements 12 of the two partial mirrors in the circumferential direction of base 7a. By repeating steps of jointing spacers 7b and partial mirrors alternately, it is possible to obtain helical mirror 14 shown in FIG. 11.

The method of making helical mirror 14 is not limited to the above example. For methods of making helical mirror 14, other methods such as integrally molding helical mirror 14 with a resin, may be employed.

Although, with the present embodiment, reflector elements 12 are arranged in helix at regular intervals along the outer peripheral surface of base 7, reflector elements 12 is not necessarily arranged at regular intervals. Reflector elements 12 may be provided discretely on the outer peripheral surface of base 7 at slightly varying intervals.

Embodiment 10

Figure 14A:
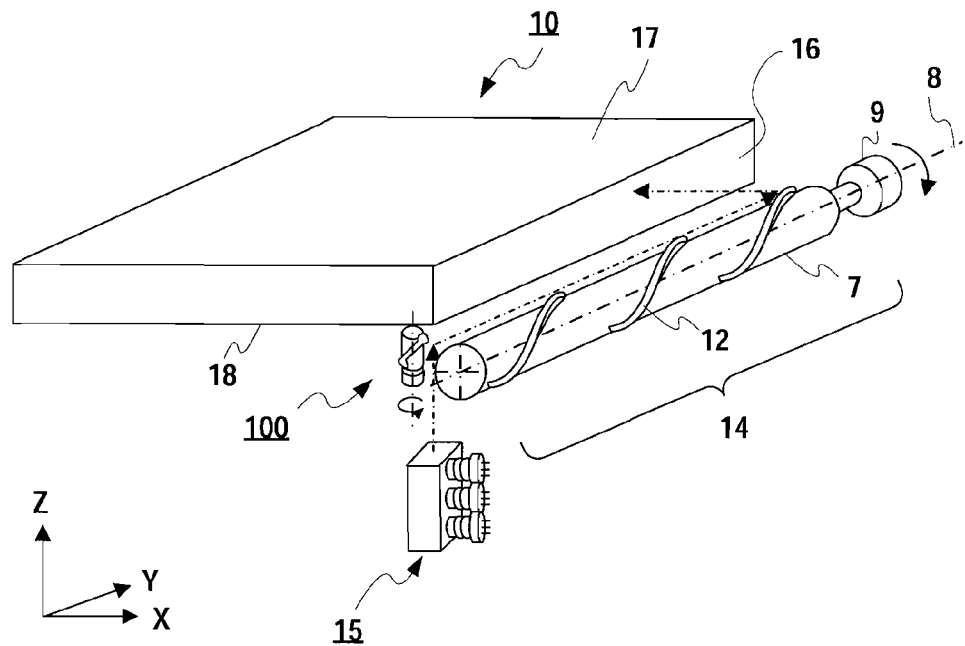
FIG. 14A is a schematic perspective view of the surface emitting apparatus according to Embodiment 10 of the present invention.
Figure 14B:
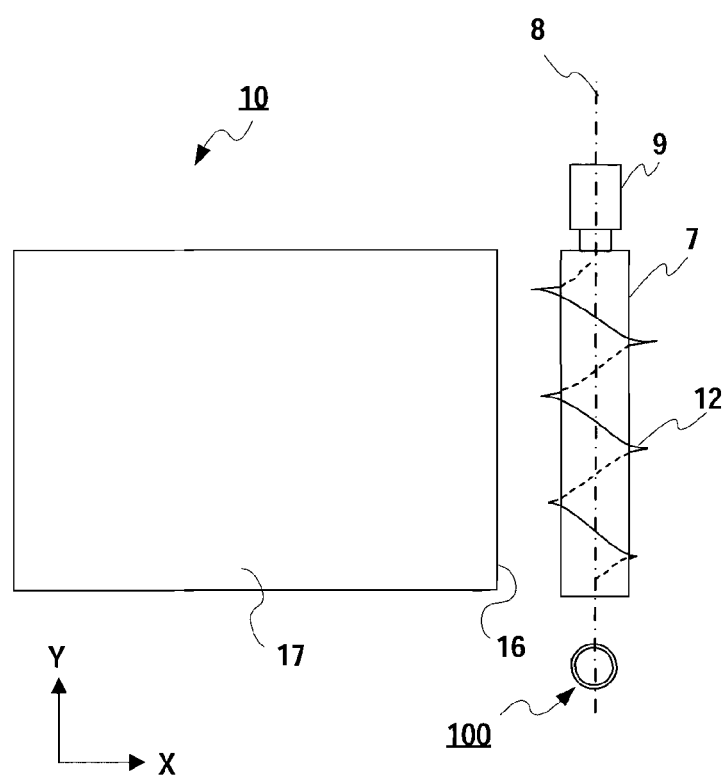
FIG. 14B is a schematic top view of the surface emitting apparatus of FIG. 14A.
Figure 15:
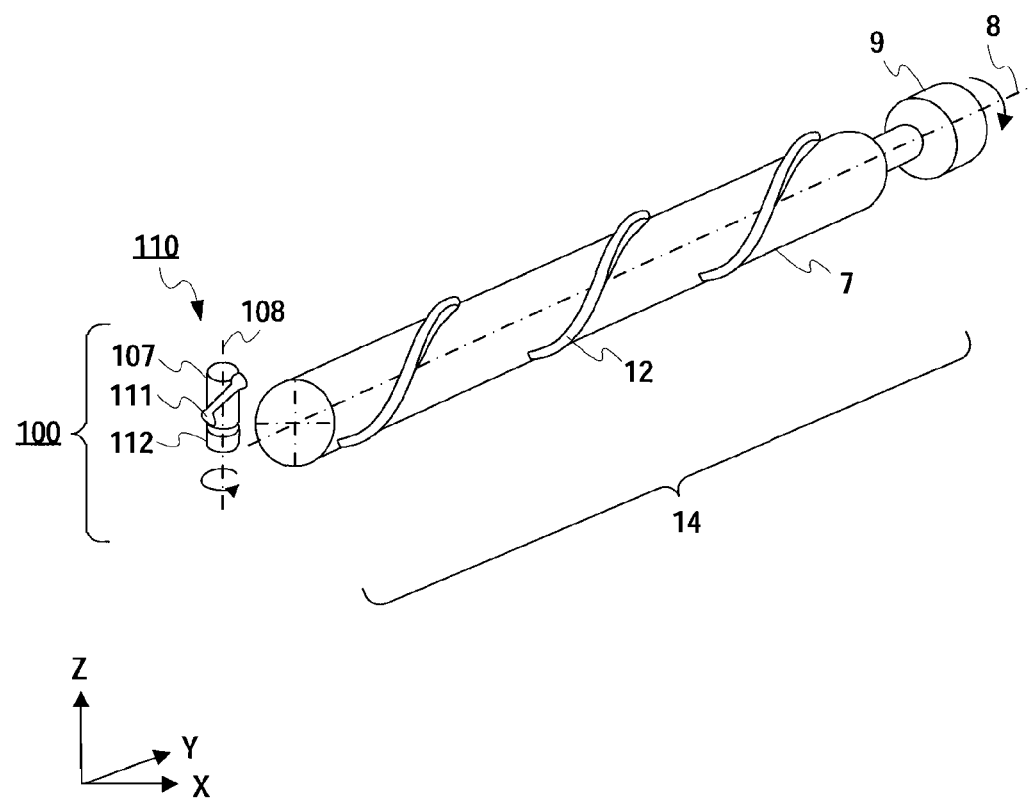
FIG. 15 is a schematic perspective view of a main scanning mechanism and a secondary scanning mechanism shown in FIG. 14A.

Next, the surface emitting apparatus according to Embodiment 10 of the present invention will be described. The surface emitting apparatus of the present embodiment differs from the surface emitting apparatuses of the above embodiments in having secondary scanning mechanism 100. FIG. 14A is a schematic perspective view of the surface emitting apparatus according to Embodiment 10 of the present invention. FIG. 14B is a schematic top view of the surface emitting apparatus of FIG. 14A. FIG. 15 is a schematic perspective view enlarging the main scanning mechanism and the secondary scanning mechanism shown in FIG. 14A.

The main scanning mechanism has main scan helical mirror 14 and main scan motor 9 that rotates main scan helical mirror 14. Main scan motor 9 is included in the first rotation control section that controls the rotation of main scan helical mirror 14. Main scan helical mirror 14 has columnar base 7 and first reflector element 12 that protrudes from the outer peripheral surface of base 7 and that is formed to extend in helix, and is arranged such that main scan rotation axis 8 and the optical axis of incident light reflected by secondary scanning mechanism 100 are parallel. Main scan rotation axis 8 is virtually parallel to inlet end face 16. As shown in FIG. 14B, the height of first reflector element 12 (i.e. radial thickness of first reflector element 12) is higher farther away from secondary scanning mechanism 100 (toward the plus Y direction). FIG. 14B shows and emphasizes the change in the height of first reflector element 12 schematically.

As shown in FIG. 15, secondary scanning mechanism 100 has secondary scan helical mirror 110 and secondary scan motor 112, and is arranged such that main scan rotation axis 8 and secondary scan rotation axis 108 cross at right angles in the same plane. Secondary scan motor 112 is included in the second rotation control section that controls the rotation of secondary scan helical mirror 110. Secondary scanning mechanism 100 is able to control the inlet position (i.e. the height of incidence) in the main scanning mechanism in the Z-axis direction where light is incident by scanning light from light source section 15. Secondary scan helical mirror 110 has columnar base 107 and second reflector element 111 that is formed to protrude from the outer peripheral surface of base 107 and extend in helix. In the part of the surface of second reflector element 111 facing light source section 15, a reflecting face that reflects light from light source section 15 is formed. Secondary scan helical mirror 110 is arranged such that secondary scan rotation axis 108 of base 107 and the optical axis of light source section 15 are virtually parallel. Further, the reflecting face of second reflector element 111 is formed to cross at a predetermined angle with the optical axis of light source section 15. The main scanning mechanism and secondary scanning mechanism 100 are included in the scanning means.

In the surface emitting apparatus configured in this way, light source section 15 emits light in the direction that crosses with light guide plate 10 at right angles. Light emitted from light source section 15 is incident on secondary scanning mechanism 100. Incident light is reflected by second reflector element 111 parallel to main scan rotation axis 8. Light incident on main scan helical mirror 14 is reflected to inlet end face 16 of light guide plate 10. Then, main scan helical mirror 14 rotates, so that the reflected light is scanned at a constant scanning speed on inlet end face 16 of light guide plate 10.

Secondary scanning mechanism 100 is able to cause rotation about secondary scan rotation axis 108 and control the inlet position in secondary scanning mechanism 100 in the Z-axis direction where light from light source section 15 is incident. That is, secondary scanning mechanism 100 is able to control the height of incidence for light incident on the main scanning mechanism. The inlet position to main scan helical mirror 14 moves in the direction along secondary scan rotation axis 108 (that is, in the positive Z-axis direction). In this case, the distance between the inlet position to first reflector element 12 and main scan rotation axis 8 increases depending on the distance between the inlet position to first reflector element 12 and second reflector element 111. As described above, the height of first reflector element 12 of main scan helical mirror 14 increases farther in the plus Y-axis direction, so that inlet end face 16 can be scanned from one end to the other end by controlling the rotation of secondary scan helical mirror 110. For example, with the present embodiment, first reflector element 12 rotates around base 7 three times and second reflector element 111 rotates around base 107 once, so that scanning can be carried out once by rotating secondary scan helical mirror 110 once while main scan helical mirror 14 rotates three times. Even when first reflector element 12 rotates around base 7 a plurality of times, light incident on first reflector element 12 from secondary scan helical mirror 110 is not blocked by first reflector element 12 other than the inlet position to first reflector element 12.

In this way, by forming first reflector element 12 such that first reflector element 12 rotates around base 7 two times or more, the diameter of base 7 can be made shorter, so that it is possible to provide a smaller surface emitting apparatus.

Although first reflector element 12 rotates around base 7 three times with the present embodiment, the present invention is not limited to this. By forming first reflector element 12 such that first reflector element 12 rotates around base 7 two times or more, the diameter of base 7 is made smaller than helical mirror 14 of Embodiment 1.

Although the height of first reflector element 12 of main scan helical mirror 14 varies with the present embodiment, the present invention is not limited to this. For example, the diameter of base 7 in a position on base 7 may increase with the position going away from secondary scan helical mirror 110. The height of first reflector element 12 or the diameter of base 7 may increase continuously or stepwise.

Embodiment 11

Figure 16:
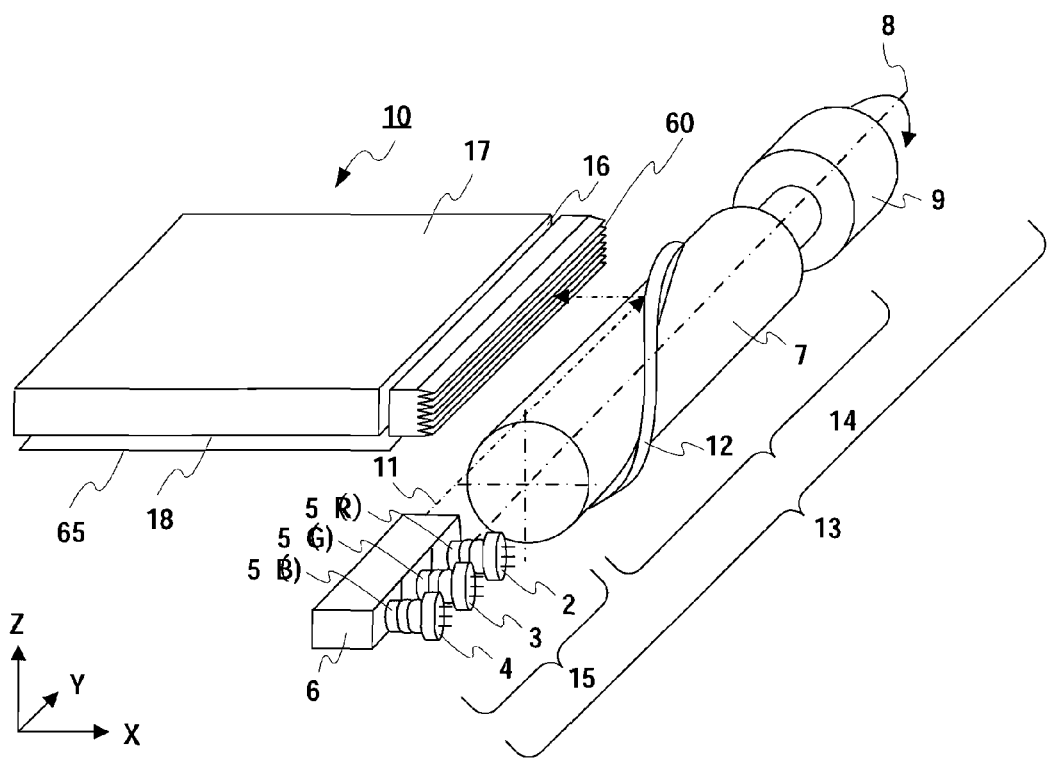
FIG. 16 is a schematic perspective view of the surface emitting apparatus according to Embodiment 11 of the present invention.
Figure 17:
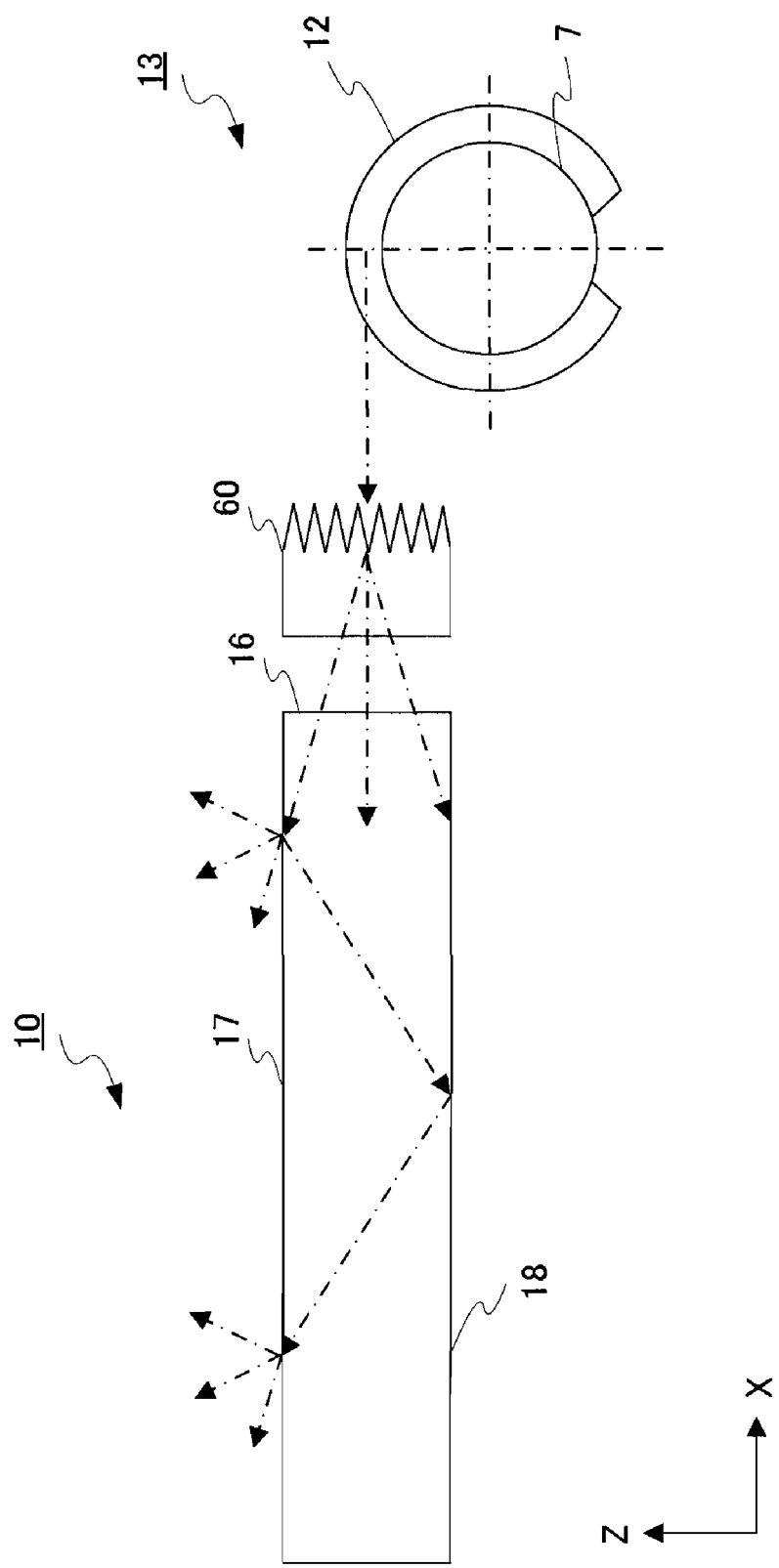
FIG. 17 is a schematic cross sectional view of the surface emitting apparatus of FIG. 16.

Next, the surface emitting apparatus according to Embodiment 11 of the present invention will be described. FIG. 16 is a schematic perspective view of the surface emitting apparatus according to Embodiment 11 of the present invention. FIG. 17 is a schematic cross sectional view of the surface emitting apparatus of FIG. 16. The surface emitting apparatus of the present embodiment has virtually the same configuration as in Embodiment 1, but is different from Embodiment 1 in further having light diffusing section 60 that diffuses light scanned by the scanning means. The configuration of light guide plate 10 is also different.

Figure 18:
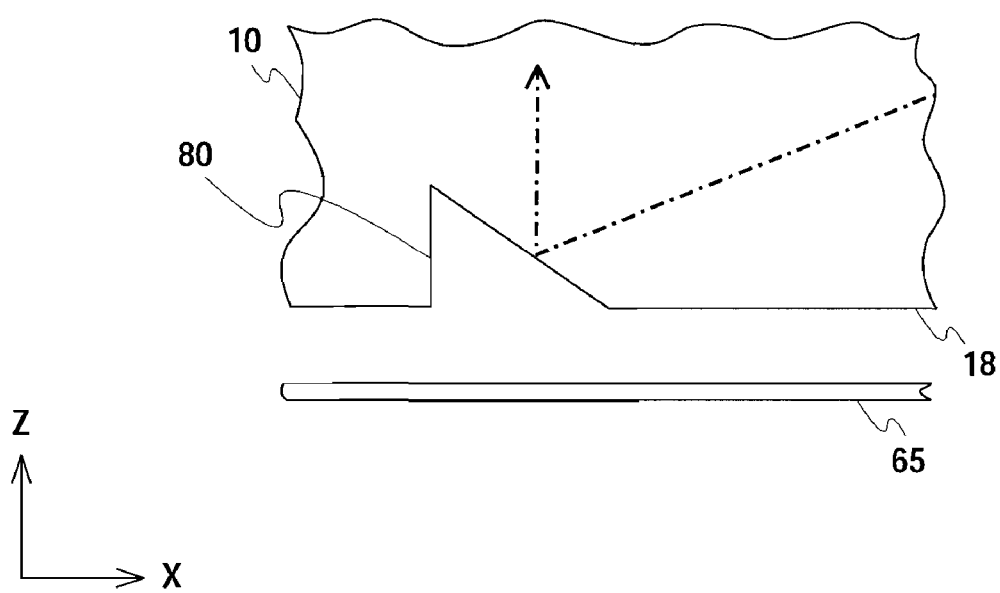
FIG. 18 is a schematic cross sectional view of the light guide plate and a reflecting sheet shown in FIG. 16.

Light guide plate 10 is formed with, for example, PMMA (acrylic resin), PC (polycarbonate) and COP (cycloolefin polymer). Light guide plate 10 has inlet end face 16 on which light from reflector element 12 is incident through light diffusing section 60, front face 17 from which light emits, back face 18 and reflecting sheet 65. Reflecting sheet 65 is formed with, for example, a metal film. Light guide plate 10 guides light incident from inlet end face 16 and emits light from the surface of front face 17. A light diffusion layer is formed in back face 18, and changing the diffusion degree depending on the distance from inlet end face 16 enables uniform surface emission. For example, as shown in the schematic cross sectional view of FIG. 18, a plurality of little indentations 80 that reflect lights incident on back face 18 in the direction closer to the normal direction of front face 17, are formed, and by adjusting the lengths, depths and density of indentations 80, the diffusion degree may be controlled. Reflecting sheet 65 is adhered to cover the light diffusion layer. Although a light diffusion layer is formed in front face 17 with Embodiment 1, a light diffusion layer is not formed in front face 17 with the present embodiment.

Figure 19:
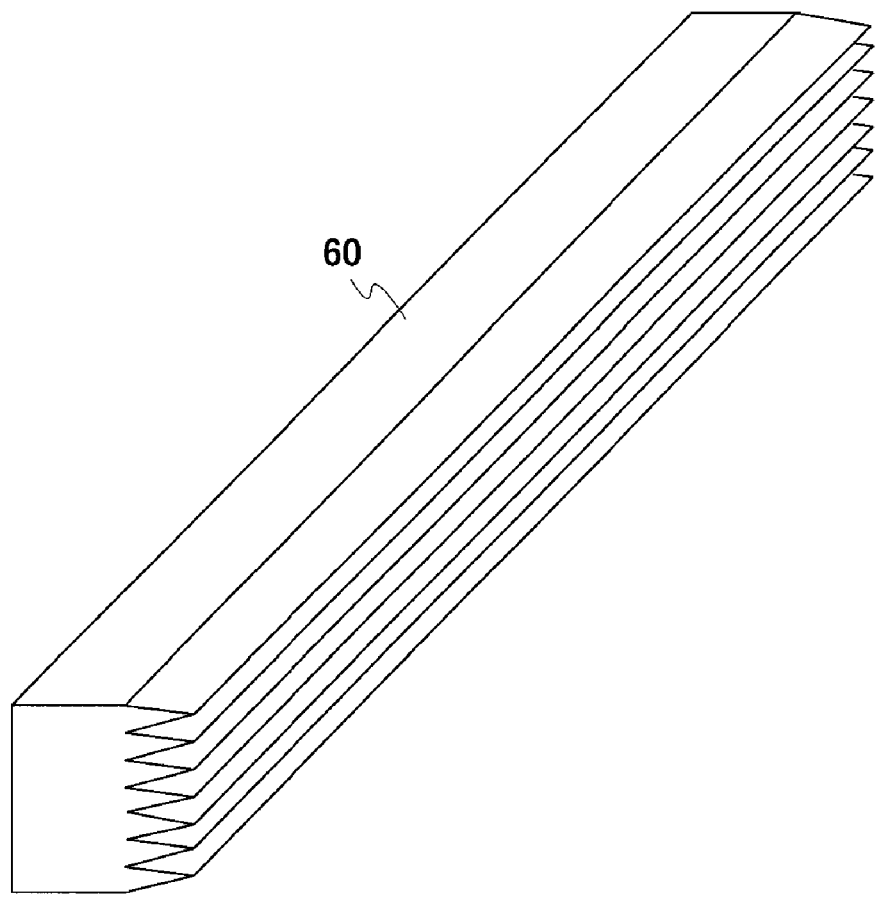
FIG. 19 is a schematic enlarged view of the light diffusing section shown in FIG. 16.

Light diffusing section 60 is translucent and diffuses light incident from reflector element 12. Light diffusing section 60 is arranged between reflector element 12 and inlet end face 16 of light guide plate 10. FIG. 19 is a schematic enlarged view of light diffusing section 60. The prism sheet on which a plurality of little indentations and projections are formed in a pattern of stripes is used in light diffusing section 60. The little indentations and projections extend in the longitudinal direction (i.e. Y-axis direction) of light guide plate 10. The prism sheet is formed by, for example, polyethylene terephthalate.

As shown in FIG. 17, light reflected by reflector element 12 of helical mirror 14 is incident on light diffusing section 60 and is diffused. Diffused lights are incident on light guide plate 10 from inlet end face 16 and then propagate inside light guide plate 10 repeating total reflection. As long as propagating lights are not diffused by the light diffusion layer formed in back face 18 of light guide plate 10, the propagating lights propagate inside light guide plate 10 repeating total reflection. Parts of lights diffused by the light diffusion layer are emitted from front face 17 as illumination lights. As described above, the diffusion degree of the light diffusion layer formed in front face 17 is changed depending on the distance from inlet end face 16, so that it is possible to make the quantity of light emitted uniform throughout front face 17.

As described above, the surface emitting apparatus of the present embodiment has light diffusing section 60 between reflector element 12 and inlet end face 16 of light guide plate 10, so that it is possible to control the angles of incidence of lights incident on inlet end face 16 in a range between minus 45 degrees and plus 45 degrees. When the angle is zero degree, light is incident vertically on inlet end face 16.

Embodiment 12

Figure 20:
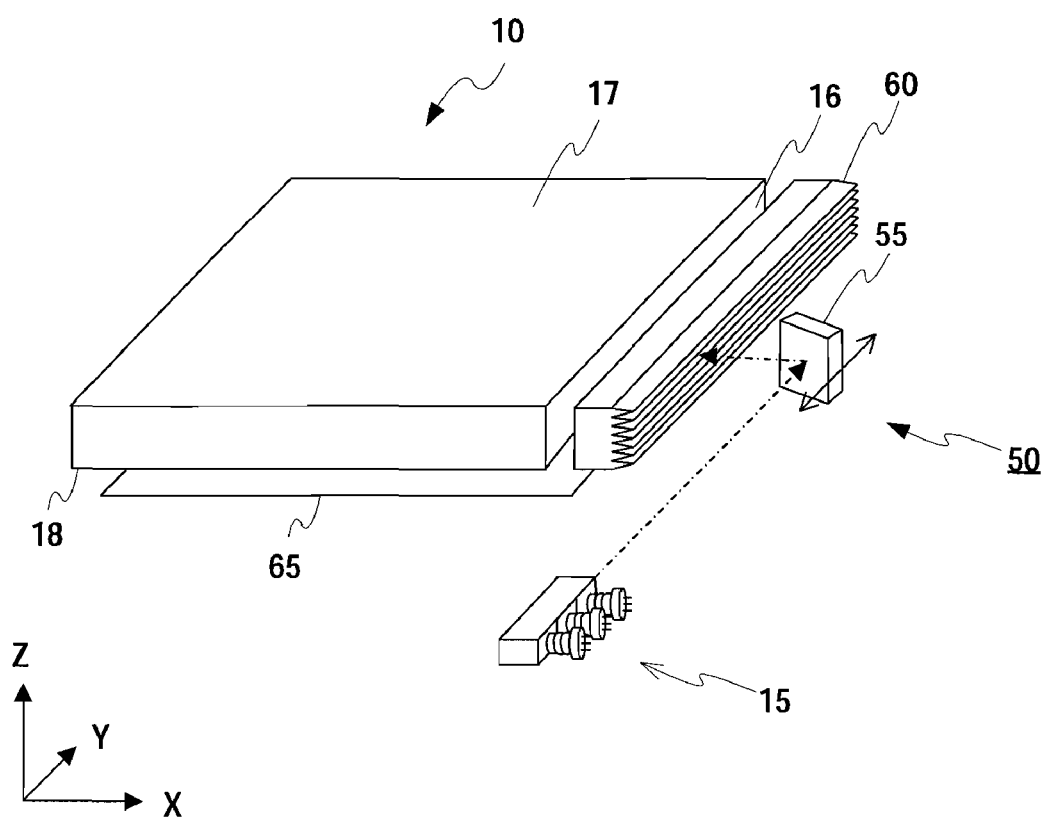
FIG. 20 is a schematic perspective view of the surface emitting apparatus according to Embodiment 12 of the present invention.

Next, the surface emitting apparatus according to Embodiment 12 of the present invention will be described. FIG. 20 is a schematic perspective view of the surface emitting apparatus according to Embodiment 12 of the present invention. Although, with Embodiment 11, the scanning means includes helical mirror 14, with the present embodiment, the scanning means differs from Embodiment 11 in including a mirror that is able to go back and forth in the Y-axis direction. The same components as in Embodiment 11 will be assigned the same reference numerals and differences will be mainly described below.

The surface emitting apparatus has light source section 15, light scanning mechanism 50, light guide plate 10 and light diffusing section 60. Light scanning mechanism 50 has mirror 55 (reflector element) that reflects light from light source section 15 such that the light is incident on inlet end face 16 of light guide plate 10. Mirror 55 moves along inlet end face 16, and light reflected by mirror 55 is scanned on inlet end face 16. Mirror 55 is diagonal to the optical angle of light source section 15 at a predetermined angle.

Next, the operation of the surface emitting apparatus configured as described above will be described. Light emitted from light source section 15 is incident on mirror 55 and is reflected toward light diffusing section 60. Mirror 55 moves linearly at a constant speed in the Y-axis direction, and so light reflected by mirror 55 is incident on light diffusing section 60 while being scanned at a constant speed in the width direction (i.e. Y-axis direction) of light guide plate 10. Lights diffused by light diffusing section 60 are incident on inlet end face 16 of light guide plate 10 and then propagate inside light guide plate 10 repeating total reflection. Parts of lights diffused by the light diffusion layer are emitted from front face 17 as illumination lights. Although illumination lights are linearly emitted from front face 17 momentarily, the scanning period for the light scanned by mirror 55 is sufficiently short compared to the time the observer's eye requires to react, so that, when the observer looks at front face 17 of light guide plate 10, the observer is able to observe illumination lights of predetermined brightness distribution (luminance distribution).

As described above, the surface emitting apparatus of the present embodiment scans light at a constant speed in the width direction of inlet end face 16 of light guide plate 10 by moving mirror 55, so that it is possible to improve luminance uniformity in a simple configuration. According to the surface emitting apparatus of the present embodiment, light guide plate 10 is formed with a resin such as PMMA (acrylic resin) and has a refractive index around 1.5, and so lights incident on inlet end face 16 of light guide plate 10 propagate inside light guide plate 10 repeating total reflection as long as the lights are not diffused by the light diffusion layer formed in back face 18. As a result, the surface emitting apparatus of the present embodiment is also able to improve luminance uniformity.

The surface emitting apparatus of the present embodiment has light diffusing section 60 between mirror 55 and inlet end face 16 of light guide plate 10, so that it is possible to control the angles of incidence of lights incident on inlet end face 16 in a range between minus 45 degrees and plus 45 degrees.

According to the surface emitting apparatus of the present embodiment, the diffusion degree of the light diffusion layer formed in back face 18 is changed depending on the distance from inlet end face 16, so that it is possible to make the quantity of light emitted uniform throughout front face 17 of light guide plate 10.

Light diffusing section 60 of the present embodiment is translucent and diffuses incident light in the thickness direction of light guide plate 10. Light diffusing section 60 can be formed with a translucent resin in which lenticular lenses, beads or fibers are mixed.

Either a transmitting light diffusion layer or a reflecting light diffusion layer can be used for the light diffusion layer formed in back face 18. Although little indentations 80 are formed in the light diffusion layer of the present embodiment to change the diffusion degree depending on the distance from inlet end face 16, white ink that diffuses reflection may be applied to back face 18. In this case, the diffusion degree may be controlled by adjusting the scale of white ink dots.

The reflecting sheet needs to be arranged on the opposite side of front face 17 from which illumination lights emit. On the other hand, the light diffusion layer may be formed in either front face 17 or back face 18.

Embodiment 13

Figure 21:
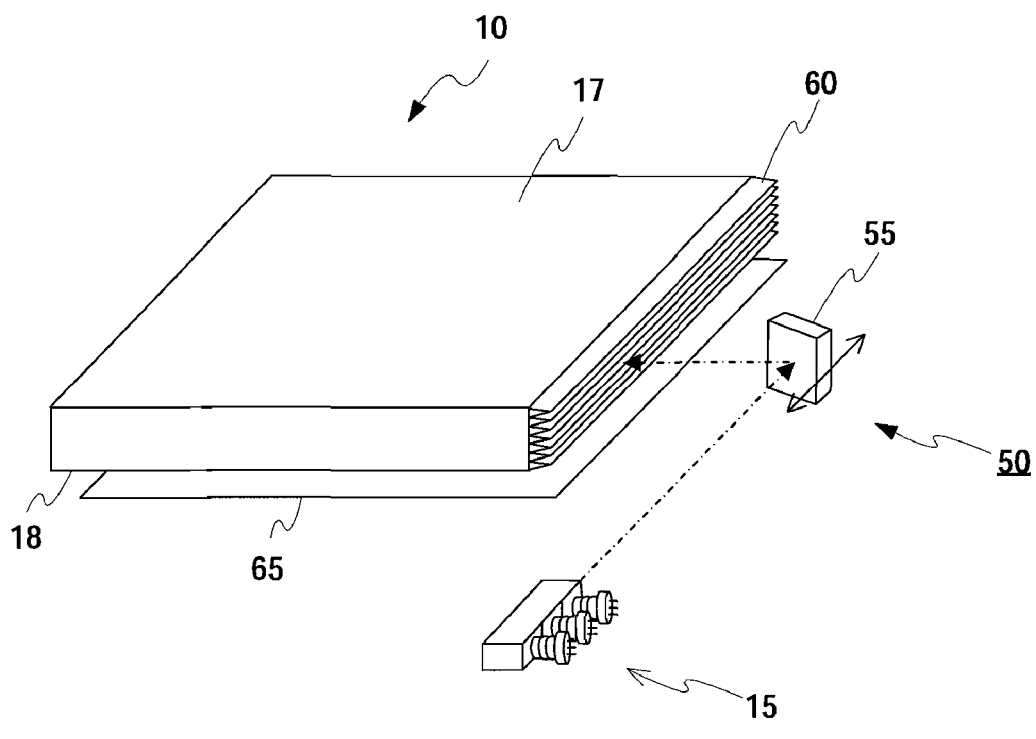
FIG. 21 is a schematic perspective view of the surface emitting apparatus according to Embodiment 13 of the present invention.

Next, the surface emitting apparatus according to Embodiment 13 of the present invention will be described. FIG. 21 is a schematic perspective view of the surface emitting apparatus according to Embodiment 13 of the present invention. The surface emitting apparatus of the present embodiment has virtually the same configuration as the surface emitting apparatus of Embodiment 12, but is different from Embodiment 12 in forming light guide plate 10 and light diffusing section 60 integrally. Although, with Embodiment 12, light diffusing section 60 is arranged between mirror 55 and inlet end face 16 of light guide plate 10, with the present embodiment, light diffusing section 60 is formed on the end face of light guide plate 10. For example, if light guide plate 10 is manufactured by injection molding, the part matching the end face of light guide plate 10 in the mold for molding is engraved. By copying the shape of the part engraved upon molding, it is possible to form light diffusing section 60 on the end face. According to this method, it is possible to reduce cost for manufacturing light guide plate 10 formed integrally with light diffusing section 60.

As described above, according to the surface emitting apparatus of the present embodiment, interfaces are reduced compared to the case where there is space between light guide plate 10 and light diffusing section 60, so that it is possible to improve the rate of incidence of light which is reflected by mirror 55 and is incident on light guide plate 10. Consequently, the surface emitting apparatus of the present embodiment is able to improve luminance uniformity similar to Embodiment 12 and improve the use efficiency of light.

Embodiment 14

Figure 22:
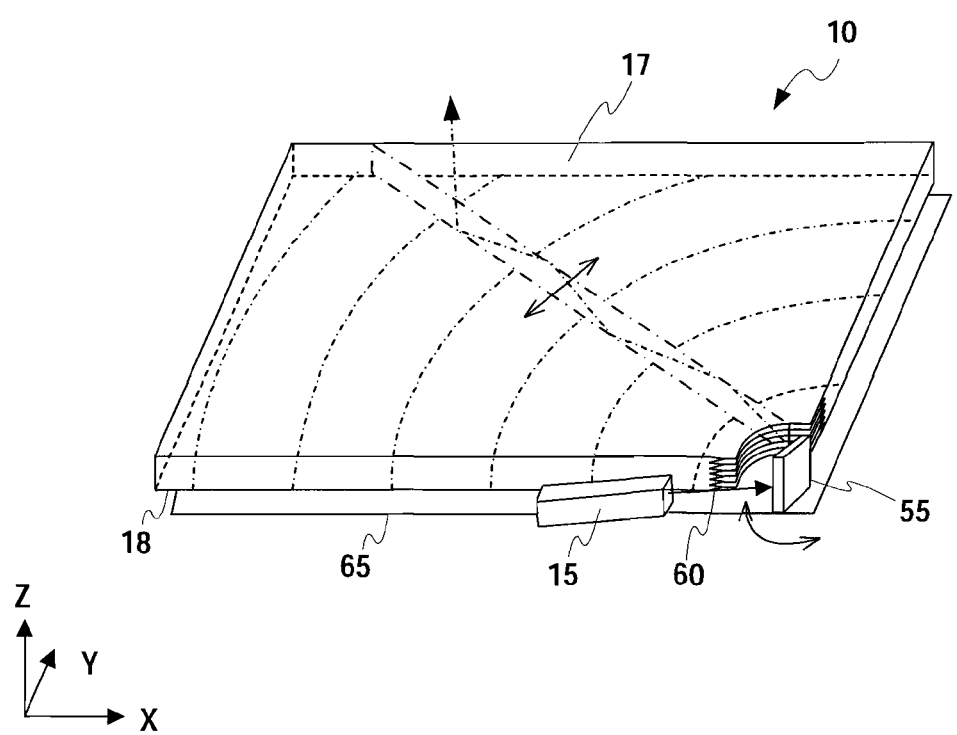
FIG. 22 is a schematic perspective view of the surface emitting apparatus according to Embodiment 14 of the present invention.

Next, the surface emitting apparatus according to Embodiment 14 of the present invention will be described. FIG. 22 is a schematic perspective view of the surface emitting apparatus according to Embodiment 14 of the present invention. The surface emitting apparatus of the present invention differs from Embodiment 13 in scanning the light by swinging mirror 55.

One of the four corners that can be seen when light guide plate 10 is viewed from the Z-axis direction, is cut off. The cross section is curved and is used for an inlet end face. Further, light diffusing section 60 that diffuses incident light is formed in the inlet end face.

In a position facing the cross section, mirror 55 is arranged that is supported to allow swing about swing axis parallel to the Z-axis and that reflects light from light source section 15 in the normal direction of the cross section. The angle of swing of mirror 55 is adjusted such that the light can be guided throughout light guide plate 10. According to this configuration, light emitted from light source section 15 is scanned on the inlet end face of light guide plate 10.

As described above, the surface emitting apparatus of the present embodiment has the same effects as in Embodiment 13, and, according to the surface emitting apparatus of the present embodiment, mirror 55 is arranged in a position facing the cross section and light source section 15 is arranged on the lateral side face of light guide plate 10, so that it is possible to provide a more compact surface emitting apparatus.

Embodiment 15

Figure 23A:
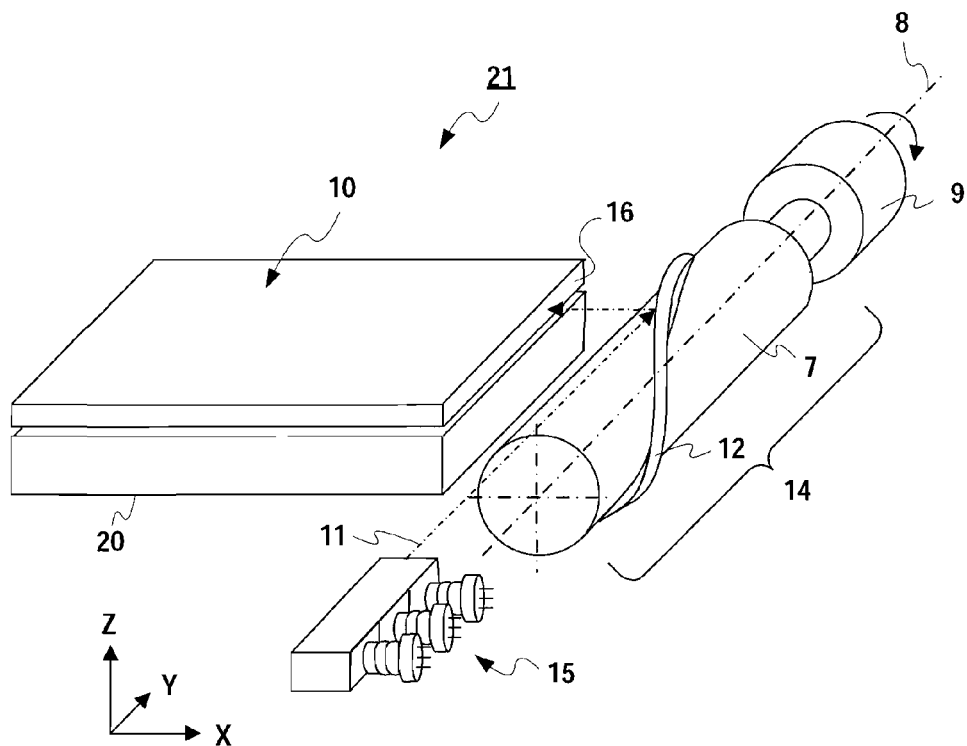
FIG. 23A is a schematic perspective view of an image display apparatus according to Embodiment 15 of the present invention.
Figure 23B:
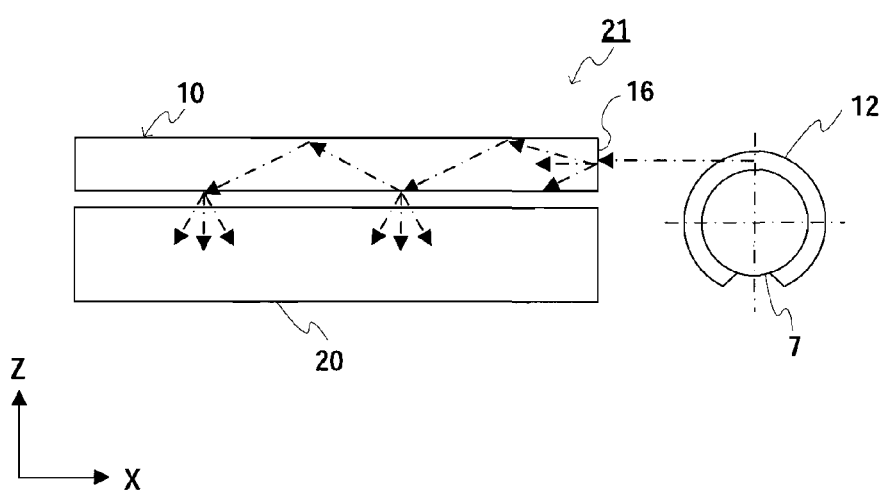
FIG. 23B is a schematic cross sectional view of the image display apparatus of FIG. 23A.

Next, the image display apparatus according to Embodiment 15 of the present invention will be described. FIG. 23A is a schematic perspective view of an image display apparatus according to Embodiment 15 of the present invention. FIG. 23B is a schematic cross sectional view of the image display apparatus of FIG. 23A. Image display apparatus 21 has a surface emitting apparatus that has virtually the same configuration as the surface emitting apparatus of Embodiment 1 and display panel 20 arranged on the side of the outlet face of light guide plate 10.

Light guide plate 10 of the present embodiment has a back face that is oriented to the plus Z direction and that includes the reflecting sheet, and a front face that is oriented to the minus Z direction and that includes the light diffusion layer. In this way, light incident on inlet end face 16 of light guide plate 10 is emitted from the front face oriented to the minus Z direction.

At the position opposing the front face (outlet face) of light guide plate 10, display panel 20 forming an image that needs to be displayed based on a signal inputted from outside is arranged. Display panel 20 is, for example, a known reflecting or semi-transmission liquid crystal panel and includes a polarization plate, a $\lambda/4$ plate and a liquid crystal display cell. Light emitted from the front face of light guide plate 10 is incident on display panel 20, and an image is displayed utilizing the block and transmission of the light by display panel 20. In this case, display panel 20 blocks or transmits light emitted from front face 17 of light guide plate 10 according to an input signal from outside on a per pixel basis. In this way, by arranging display panel 20 on the side of the front face of light guide plate 10, it is possible to make an image display apparatus compact without extra space.

As described above, according to the image display apparatus of the present embodiment, light guide plate 10, display panel 20 and helical mirror 14 are provided in an efficient arrangement (that is, helical mirror 14 is arranged on the lateral side of light guide plate 10 and display panel 20), so that it is possible to provide a more compact image display apparatus. Although the surface emitting apparatus that has virtually the same configuration as the surface emitting apparatus of Embodiment 1 is used with the present embodiment, the same effects can be obtained even if the surface emitting apparatuses of other embodiments are used.

Embodiment 16

Figure 24A:
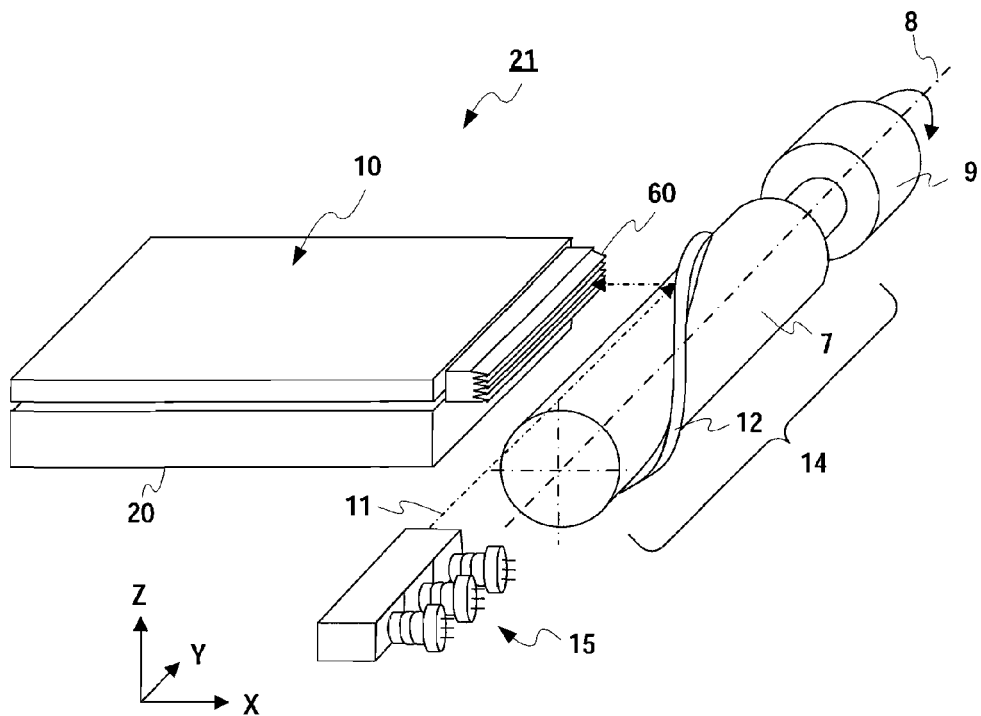
FIG. 24A is a schematic perspective view of the image display apparatus according to Embodiment 16 of the present invention.
Figure 24B:
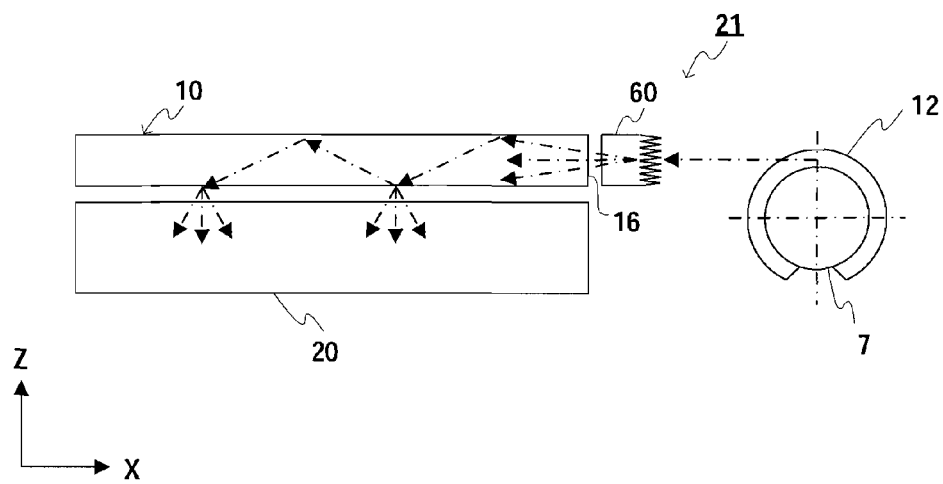
FIG. 24B is a schematic cross sectional view of the image display apparatus of FIG. 24A.

Next, the image display apparatus according to Embodiment 16 of the present invention will be described. FIG. 24A is a schematic perspective view of the image display apparatus according to Embodiment 16 of the present invention. FIG. 24B is a schematic cross sectional view of the image display apparatus of FIG. 24A. The image display apparatus of the present embodiment has virtually the same configuration as in Embodiment 15, and further has light diffusion section 60 described in Embodiment 11. Light diffusing section 60 diffuses light incident on light guide plate 10 from reflector element 12.

As described above, the image display apparatus of the present embodiment has light diffusing section 60 between reflector element 12 and inlet end face 16 of light guide plate 10, so that it is possible to control the angles of incidence of lights incident on inlet end face 16 in a range between minus 45 degrees and plus 45 degrees.

The light scanning mechanism of the surface emitting apparatus according to the above embodiments can be applied to electronic equipment such as printers and copying machines.

In the above embodiments, light source section 15 includes a semiconductor laser, but may include a light source that tolerates little convergence and divergence. The light source section may include, for example, an LED combined with a collimating lens or a high pressure mercury vapor lamp combined with a reflector.

What is claimed is:

1. A surface emitting apparatus, comprising:
a light source section that emits a light;
a light guide plate that guides light incident from an inlet face such that the light is emitted from a surface of an outlet face; and
a scanning section that scans the light emitted from the light source section on the inlet face of the light guide plate,
wherein the scanning section comprises:
a reflector element that is helical and that reflects the light emitted from the light source section such that the light is incident on the inlet face of the light guide plate; and
a rotation control section that rotates the reflector element about a center axis of the helix of the reflector element and scans the light reflected by the reflector element on the inlet face of the light guide plate.

2. The surface emitting apparatus according to claim 1, wherein the reflector element is formed such that a position of the center axis of the helix of the reflector element in a thickness direction of the light guide plate is equal to a middle of the inlet face of the light guide plate in the thickness direction of the light guide plate.

3. The surface emitting apparatus according to claim 1, wherein the reflector element is formed such that an angle formed by the center axis of the helix of the reflector element and the reflector element is 45 degrees.

4. The surface emitting apparatus according to claim 1, wherein the reflector element is formed such that an angle formed by the center axis of the helix of the reflector element and the reflector element is less than 45 degrees.

5. The surface emitting apparatus according to claim 4, wherein the center axis of the helix of the reflector element is diagonal to the inlet face of the light guide plate such that the light reflected by the reflector element is incident vertically on the inlet face of the light guide plate.

6. The surface emitting apparatus according to claim 4, further comprising a refractor element that refracts the light reflected by the reflector element such that the refracted light is incident vertically on the inlet face of the light guide plate.

7. The surface emitting apparatus according to claim 1, further comprising a base that has a shape of one of a column, a cylinder, a prism and a hollow prism,
wherein the reflector element is formed on an outer peripheral surface of the base.

8. A surface emitting apparatus, comprising:
a light source section that emits a light;
a light guide plate that guides light incident from an inlet face such that the light is emitted from a surface of an outlet face; and
a scanning section that scans the light emitted from the light source section on the inlet face of the light guide plate,
wherein the scanning section comprises:
a base that rotates;
a plurality of reflector elements that are provided in a helical arrangement about a rotation axis of the base and that reflect the light emitted from the light source section such that the light is incident on the inlet face of the light guide plate; and
a rotation control section that rotates the base and scans the light reflected by the reflector element on the inlet face of the light guide plate.

9. The surface emitting apparatus according to claim 8, wherein:
the plurality of reflector elements are arranged without space as viewed from a direction of the rotation axis of the base; and
adjacent reflector elements of the plurality of reflector elements are spaced apart in the direction of the rotation axis of the base.

10. A surface emitting apparatus, comprising:
a light source section that emits a light;
a light guide plate that guides light incident from an inlet face such that the light is emitted from a surface of an outlet face; and
a scanning section that scans the light emitted from the light source section on the inlet face of the light guide plate,
wherein the scanning section comprises:
a secondary scanning mechanism that scans the light emitted from the light source section; and
a main scanning mechanism that scans the light incident from the secondary scanning mechanism on the inlet face of the light guide plate,
wherein the secondary scanning mechanism changes by the scan an inlet position in the main scanning mechanism where the light is incident.

11. The surface emitting apparatus according to claim 10, wherein:
the main scanning mechanism comprises:
a first reflector element that is helical and that reflects the light incident from the secondary scanning mechanism such that the light is incident on the inlet face of the light guide plate; and
a first rotation control section that rotates the first reflector element about a center axis of the helix of the first reflector element and scans the light reflected by the first reflector element on the inlet face of the light guide plate,
the secondary scanning mechanism comprises:
a second reflector element that is helical and that reflects the light emitted from the light source section such that the light is incident on the first reflector element; and
a second rotation control section that rotates the second reflector element about a center axis of the helix of the second reflector element and changes an inlet position in the first reflector element where the light is incident; and the first reflector element is formed such that a distance between the inlet position in the first reflector element where the light is incident from the secondary scanning mechanism and the center axis of the helix of the first reflector element increases depending on a distance between the inlet position and the second reflector element.

12. A surface emitting apparatus, comprising:
a light source section that emits a light;
a light guide plate that guides light incident from an inlet face such that the light is emitted from a surface of an outlet face; and
a scanning section that scans the light emitted from the light source section on the inlet face of the light guide plate,
wherein the scanning section comprises:
a plurality of reflector elements that are helical and that reflect the light emitted from the light source section such that the light is incident on the inlet face of the light guide plate; and
a rotation control section that rotates the plurality of reflector elements about center axes of the helices of the plurality of reflector elements and that scans the light reflected by the plurality of reflector elements on the inlet face of the light guide plate.

13. The surface emitting apparatus according to claim 12, wherein the plurality of reflector elements are formed such that the center axes of the helices of the plurality of reflector elements are arranged stepwise.

14. The surface emitting apparatus according to claim 12, wherein the plurality of reflector elements are formed such that the center axes of the helices of the plurality of reflector elements are arranged apart from each other in a direction crossing at right angles with the inlet face of the light guide plate, and a distance between the center axis of the helix of each of reflector elements and an inlet position in the reflector element where the light is incident increases depending on a distance between the center axis of the helix of the reflector element and the inlet face of the light guide plate.

15. The surface emitting apparatus according to claim 12, wherein the plurality of reflector elements are formed such that the center axes of the helices of the plurality of reflector elements extend on a plane parallel to the inlet face of the light guide plate and in a longitudinal direction of the inlet face of the light guide plate and are arranged apart from each other.

16. A surface emitting apparatus, comprising:
a light source section that emits a light;
a light guide plate that guides light incident from an inlet face such that the light is emitted from a surface of an outlet face;
a scanning section that scans the light emitted from the light source section on the inlet face of the light guide plate; and
a light diffusing section that diffuses the light scanned by the scanning section.

17. The surface emitting apparatus according to claim 16, wherein the light guide plate and the light diffusing section are formed integrally.

18. An image display apparatus comprising:
a light source section that emits a light;
a light guide plate that guides light incident from an inlet face such that the light is emitted from a surface of an outlet face;
a scanning section that scans the light emitted from the light source section on the inlet face of the light guide plate; and
a display panel that is arranged on a side of the outlet face of the light guide plate.

* * * * *